US009412148B2

(12) United States Patent
Tanaka et al.

(10) Patent No.: US 9,412,148 B2
(45) Date of Patent: Aug. 9, 2016

(54) TRANSMISSION TERMINAL, TRANSMISSION METHOD, AND COMPUTER-READABLE RECORDING MEDIUM STORING TRANSMISSION PROGRAM

(71) Applicants: Kenji Tanaka, Kanagawa (JP); Alain Volmat, Tokyo (JP); Masaki Nakagawa, Kanagawa (JP); Takahiro Asai, Kanagawa (JP)

(72) Inventors: Kenji Tanaka, Kanagawa (JP); Alain Volmat, Tokyo (JP); Masaki Nakagawa, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/632,301

(22) Filed: Feb. 26, 2015

(65) Prior Publication Data

US 2015/0170326 A1 Jun. 18, 2015

Related U.S. Application Data

(63) Continuation of application No. 13/643,827, filed as application No. PCT/JP2011/060676 on Apr. 27, 2011, now Pat. No. 9,001,179.

(30) Foreign Application Priority Data

May 6, 2010 (JP) .................... 2010-106610
Sep. 1, 2010 (JP) .................... 2010-195692
Mar. 23, 2011 (JP) .................... 2011-064073

(51) Int. Cl.
*H04N 7/14* (2006.01)
*H04L 9/32* (2006.01)
(Continued)

(52) U.S. Cl.
CPC .............. *G06T 1/20* (2013.01); *G06F 3/1454* (2013.01); *H04L 12/1827* (2013.01); *H04N 5/38* (2013.01);
(Continued)

(58) Field of Classification Search
CPC .. G06F 3/1454; H04L 12/1827; H04N 7/142; H04N 7/152; G09G 2340/0407; G09G 2350/00; G09G 2370/025
USPC ............ 348/14.03, 14.07, 14.1, 14.12, 14.14; 713/168, 170, 171
See application file for complete search history.

(56) References Cited

U.S. PATENT DOCUMENTS 6,760,749 B1   7/2004  Dunlap et al.
7,171,473 B1   1/2007  Eftis et al.
(Continued)

FOREIGN PATENT DOCUMENTS

JP        5-49024       2/1993
JP    2002-238040 A     8/2002
(Continued)

OTHER PUBLICATIONS

International Search Report Issued Jul. 5, 2011 in PCT/JP2011/060676 Filed on Apr. 27, 2011.
(Continued)

*Primary Examiner* — Binh Tieu
(74) *Attorney, Agent, or Firm* — Oblon, McClelland, Maier & Neustadt, L.L.P

(57) ABSTRACT

A transmission terminal transmits video data and display data of a screen shared with another transmission terminal to the other transmission terminal via a predetermined relay apparatus. The transmission terminal includes a storage unit that stores relay apparatus information of the relay apparatus to which the transmission terminal transmits the video data; a receive unit that receives the display data from an external input apparatus connected to the transmission terminal; and a transmitting unit that transmits the display data received by the receive unit to the relay apparatus indicated by the relay apparatus information stored in the storage unit.

10 Claims, 27 Drawing Sheets

(51) Int. Cl.
*G06T 1/20* (2006.01)
*G06F 3/14* (2006.01)
*H04L 12/18* (2006.01)
*H04N 7/15* (2006.01)
*H04N 5/38* (2006.01)

(52) U.S. Cl.
CPC ............... *H04N 7/142* (2013.01); *H04N 7/152* (2013.01); *G09G 2340/0407* (2013.01); *G09G 2350/00* (2013.01); *G09G 2370/025* (2013.01)

(56) References Cited

U.S. PATENT DOCUMENTS

| | | | |
|---|---|---|---|
| 8,400,489 B2 * | 3/2013 | Le Goff | G10L 15/1822 348/14.07 |
| 8,400,530 B2 | 3/2013 | Ikeda et al. | |
| 8,458,255 B2 * | 6/2013 | Takeuchi | H04N 1/00183 709/204 |
| 8,793,765 B2 | 7/2014 | Volmat et al. | |
| 9,065,874 B2 * | 6/2015 | Moyers | H04L 65/1069 |
| 2003/0088534 A1 | 5/2003 | Kalantar et al. | |
| 2004/0068521 A1 * | 4/2004 | Haacke | G06F 17/30899 |
| 2004/0237122 A1 * | 11/2004 | Yamaguchi | H04L 1/1854 725/136 |
| 2005/0060547 A1 | 3/2005 | Saito et al. | |
| 2005/0132412 A1 | 6/2005 | Richardson et al. | |
| 2006/0002315 A1 | 1/2006 | Theurer et al. | |
| 2006/0087987 A1 * | 4/2006 | Witt et al. | 370/260 |
| 2006/0173854 A1 | 8/2006 | Ottaviani et al. | |
| 2007/0201563 A1 * | 8/2007 | Yamaguchi | H04L 1/1854 375/240.26 |
| 2007/0282994 A1 | 12/2007 | Beers et al. | |
| 2008/0018809 A1 * | 1/2008 | Miyawaki | G02F 1/133553 348/790 |
| 2008/0120372 A1 * | 5/2008 | Kariathungal | G06F 19/321 709/204 |
| 2008/0183820 A1 | 7/2008 | Golovchinsky et al. | |
| 2008/0235745 A1 * | 9/2008 | Edwards et al. | 725/110 |
| 2009/0300194 A1 | 12/2009 | Ogasawara | |
| 2009/0315973 A1 * | 12/2009 | Izotov et al. | 348/14.07 |
| 2009/0327917 A1 * | 12/2009 | Aaron | H04L 67/36 715/751 |
| 2009/0327918 A1 * | 12/2009 | Aaron | H04L 67/36 715/751 |
| 2010/0124906 A1 * | 5/2010 | Hautala | G06Q 10/10 455/412.1 |
| 2010/0188475 A1 * | 7/2010 | Le Goff | G10L 15/1822 348/14.08 |
| 2011/0058552 A1 | 3/2011 | Shimizu et al. | |
| 2012/0002003 A1 | 1/2012 | Okita et al. | |
| 2012/0005475 A1 * | 1/2012 | Inagaki | H04N 7/147 713/150 |
| 2014/0015917 A1 | 1/2014 | Kato | |
| 2015/0229514 A1 * | 8/2015 | Okuyama | H04L 41/082 709/214 |
| 2015/0229720 A1 * | 8/2015 | Knighton | G06Q 10/107 709/203 |

FOREIGN PATENT DOCUMENTS

| | | |
|---|---|---|
| JP | 2004-064394 A | 2/2004 |
| JP | 2004-304666 | 10/2004 |
| JP | 2006-011716 | 1/2006 |
| JP | 2006-216018 | 8/2006 |
| JP | 2006-303921 | 11/2006 |
| JP | 2009-111640 A | 5/2009 |
| JP | 2012-075072 | 4/2012 |
| JP | 2012-075073 | 4/2012 |
| WO | WO 03/081449 A1 | 10/2003 |

OTHER PUBLICATIONS

Extended European Search Report issued Aug. 12, 2013 in Patent Application No. 11777489.3.
Office Action issued Mar. 15, 2016 in Japanese Application 2011-064073 (without English translation).

* cited by examiner

FIG.7

MODIFIED QUALITY MANAGING TABLE

| IP ADDRESS OF RELAY-DESTINATION TERMINAL | QUALITY OF RELAYED IMAGE DATA |
|---|---|
| 1.3.2.4 | HIGH |
| 1.3.1.3 | LOW |
| 1.3.4.3 | INTERMEDIATE |
| ... | ... |

FIG.8

RELAY APPARATUS MANAGING TABLE

| RELAY APPARATUS ID | STATUS | RECEPTION DATE/TIME | IP ADDRESS OF RELAY APPARATUS | MAX DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.9

TERMINAL AUTHENTICATION MANAGING TABLE

| TERMINAL ID | PASSWORD |
|---|---|
| 01aa | aaaa |
| 01ab | abab |
| 01ba | baba |
| ... | ... |

FIG.10

TERMINAL MANAGING TABLE

| TERMINAL ID | STATUS | RECEPTION DATE/TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.11

ADDRESS LIST MANAGING TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGING TABLE

| SELECTING SESSION ID | RELAY APPARATUS ID | REQUEST SOURCE TERMINAL ID | DESTINATION TERMINAL ID | DELAY TIME (ms) | DELAY INFO RECEPTION DATE/TIME |
|---|---|---|---|---|---|
| Se1 | 111a | 01aa | 01db | 200 | 2009.11.10.14:00 |
| Se2 | 111b | 01ba | 01ca | 50 | 2009.11.10.14:10 |
| Se3 | 111d | 01bb | 01da | 400 | 2009.11.10.14:20 |
| ... | ... | ... | ... | ... | ... |

FIG.13

ADDRESS PRIORITY MANAGING TABLE

| CORRESPONDENCE IN DOT ADDRESS SECTIONS | ADDRESS PRIORITY |
|---|---|
| YES. YES. YES.NO | 5 |
| YES. YES.NO.- | 3 |
| YES.NO.-.- | 1 |
| NO.-.-.- | 0 |

FIG.14

TRANSMISSION RATE PRIORITY MANAGING TABLE

| MAX DATA TRANSMISSION RATE OF RELAY APPARATUS (Mbps) | TRANSMISSION RATE PRIORITY |
|---|---|
| 1000 ~ | 5 |
| 100 ~1000 | 3 |
| 10 ~ 100 | 1 |
| ~ 10 | 0 |

FIG.15

QUALITY MANAGING TABLE

| DELAY TIME (ms) | IMAGE DATA QUALITY |
|---|---|
| 0 ~ 100 | HIGH |
| 100 ~ 300 | INTERMEDIATE |
| 300 ~ 500 | LOW |
| 500 ~ | (INTERRUPTED) |

FIG.20

| RELAY APPARATUS ID | ADDRESS PRIORITY | | TRANSMISSION RATE PRIORITY POINT | INTEGRATED POINT |
|---|---|---|---|---|
| | POINT AGAINST TERMINAL 10aa | POINT AGAINST TERMINAL 10bd | | |
| 111a | 5 | 1 | 3 | 8 |
| 111b | 3 | 1 | 5 | 8 |
| 111c | – | – | – | – |
| 111d | 1 | 5 | 1 | 6 |

FIG.24

| MATERIAL NAME | SIZE | APPLICATION NAME | DATE/TIME OF UPDATE | MATERIAL |
|---|---|---|---|---|
| DESIGN FOR **** | 182KB | DOCUMENT CREATING SOFTWARE | 2010/3/19 | DESIGN FOR ****.doc |
| **** PLAN | 65KB | SPREADSHEET SOFTWARE | 2010/03/20 | **** PLAN.xls |
| OPERATION MANUAL | 2.311KB | PRESENTATION SOFTWARE | 2010/03/21 | OPERATION MANUAL.ppt |
| ... | ... | ... | ... | ... |

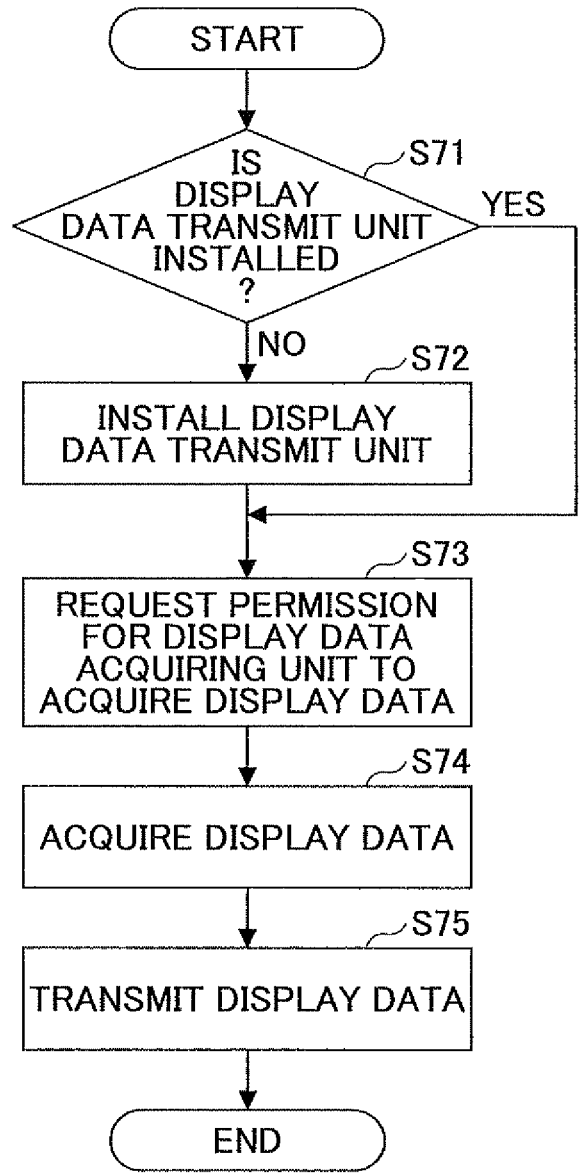

TRANSMISSION TERMINAL, TRANSMISSION METHOD, AND COMPUTER-READABLE RECORDING MEDIUM STORING TRANSMISSION PROGRAM

CROSS-REFERENCE TO RELATED APPLICATIONS

The present application is a continuation application of and claims the benefit of priority under 35 U.S.C. §120 from U.S. application Ser. No. 13/643,827, filed Oct. 26, 2012, which is a national stage of International Application No. PCT/JP2011/060676, filed Apr. 27, 2011, which is based on and claims the benefit of priority under 35 U.S.C. §119 from Japanese Priority Applications No. 2010-106610 filed May 6, 2010, No. 2010-195692 filed Sep. 1, 2010, and No. 2011-064073 filed Mar. 23, 2011, the entire contents of each of which is hereby incorporated by reference.

TECHNICAL FIELD

The disclosure generally relates to a transmission terminal capable of transmitting and receiving display data of a screen shared with another transmission terminal.

BACKGROUND ART

Time and monetary expenses for business trips and the like may be reduced by conducting a video conference. The video conference may be effected by transmitting and receiving video data and audio data between plural transmission terminals by using a transmission system based on a communication network, such as the Internet. Due to improvements in broadband technology in recent years, it is now possible to transmit or receive high-quality image and audio data. As a result, participants of a video conference can not only monitor the situation on the other end of the communication line but also communicate verbally with one another with an improved level of understanding.

During the video conference, the conference participants may discuss material displayed on the screen of a computer separate from the transmission terminal on one end of the transmission line. In such a case, a participant on the one end may wish to transmit the data of the displayed material (which may be referred to as "display data") to another participant across the communication network so that they can share the same material, in addition to transmitting audio data or video data from one party to the other.

U.S. Pat. No. 6,760,749 B1 discusses a technology whereby the display data of a material, which is referred to as "presentation content" in the related art, is transmitted together with the audio and video data to a distributing apparatus during a telephone conference via a network. The distributing apparatus then distributes the data or other information to transmission terminals. In this way, the video conference participants can refer to the same material while listening to or looking at each other during the video conference.

However, in the above related art, when the material (presentation content) is managed in a computer other than the transmission terminal from which the video or audio data is transmitted during the conference, the computer needs to be placed under the management of a transmission managing system. As a result, the processing load of the transmission managing system increases.

SUMMARY OF INVENTION

Accordingly, it is a general object of the present invention to overcome the problem of the related art. A more specific object may be to provide a transmission terminal capable of allowing display data stored in an external input apparatus to be transmitted without logging the external apparatus into a transmission managing system, thus preventing the increase in the processing load of the transmission managing system.

In one aspect, a transmission terminal for transmitting video data and display data of a screen shared with another transmission terminal to the other transmission terminal via a predetermined relay apparatus includes a storage unit configured to store relay apparatus information of the relay apparatus to which the transmission terminal transmits the video data; a receive unit configured to receive the display data from an external input apparatus connected to the transmission terminal; and a transmitting unit configured to transmit the display data received by the receive unit to the relay apparatus indicated by the relay apparatus information stored in the storage unit.

In another aspect, a transmission method performed in a transmission terminal that transmits video data and display data of a screen shared with another transmission terminal to the other transmission terminal via a predetermined relay apparatus includes storing relay apparatus information of the relay apparatus in a storage unit of the transmission terminal; receiving the display data from an external input apparatus connected to the transmission terminal; and transmitting the received display data to the relay apparatus indicated by the relay apparatus information stored in the storage unit of the transmission terminal.

In another aspect, a computer-readable, non-transitory recording medium stores a transmission program that causes a transmission terminal to perform the transmission method.

These and other objects, features and advantages of the invention will be apparent to those skilled in the art from the following detailed description of the invention, when read in conjunction with the accompanying drawings and appended claims.

BRIEF DESCRIPTION OF DRAWINGS

FIG. 7 is a modified quality managing table;

FIG. 8 is a relay apparatus managing table;

FIG. 9 is a terminal authentication managing table;

FIG. 10 is a terminal managing table;

FIG. 11 is a destination list managing table;

FIG. 12 is a session managing table;

FIG. 13 is an address priority managing table;

FIG. 14 is a transmission rate priority managing table;

FIG. 15 is a quality managing table;

FIG. 20 is a table of priority points calculated for the process of narrowing the relay apparatuses;

FIG. 24 illustrates a material managing table stored in a storage unit;

FIG. 29 is a flowchart of a process of installing a display data acquiring unit in the external input apparatus.

BEST MODE FOR CARRYING OUT THE INVENTION

Overall Structure of Embodiment

Figure 1:
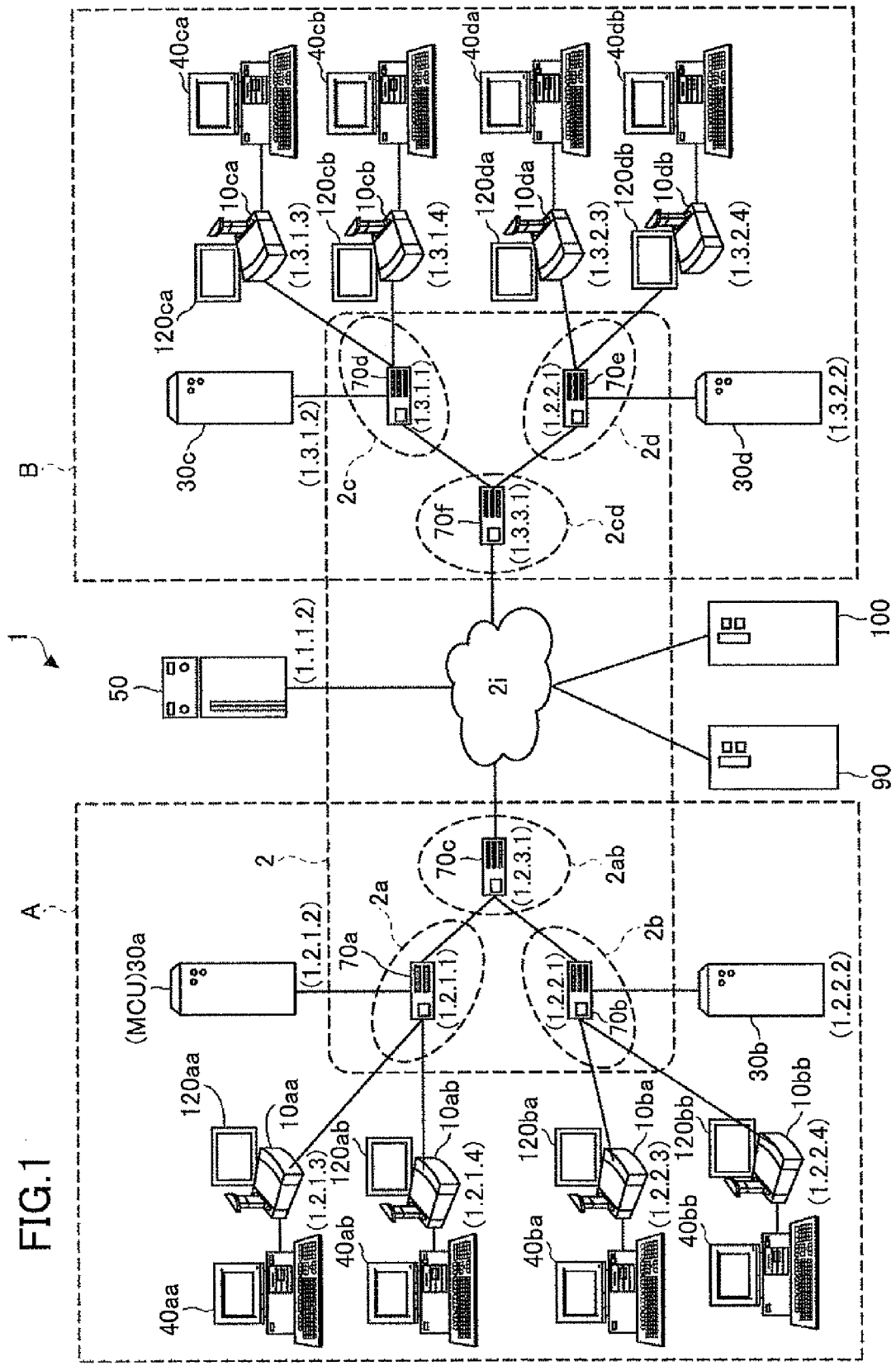
FIG. 1 illustrates a transmission system according to an embodiment of the present invention.

Embodiments of the present invention are described with reference to the attached drawings. FIG. 1 illustrates a transmission system 1 according to an embodiment. The transmission system may include a data providing system for transmitting content data from one transmission terminal to another transmission terminal via a transmission managing system, and a communication system for transmitting information or emotions among plural transmission terminals via a transmission managing system. The communication system may allow transmission of information or emotions among plural communication terminals (corresponding to "transmission terminals") via a communication managing system (corresponding to "transmission managing system"). Examples of the communication system include television or video conference systems, videophone systems, voice conference systems, voice telephony systems, and PC (Personal Computer) screen sharing systems.

In accordance with the present embodiment, a transmission system, a transmission managing system, and a transmission terminal are described with reference to a television or video conference system as an example of the communication system, a television or video conference managing system as an example of the communication managing system, and a television or video conference terminal as an example of the communication terminal. Thus, the transmission terminal and the transmission managing system according to the embodiment may be applied to not just a television or video conference system but also to a communication system or a transmission system.

Referring to FIG. 1, the transmission system 1 includes plural transmission terminals 10aa, 10ab, ..., 10db, displays 120aa, 120ab, ..., 120db for the transmission terminals 10aa, 10ab, ..., 10db, plural relay apparatuses 30a, 30b, 30c, and 30d, a transmission managing system 50, a program providing system 90, and a maintenance system 100.

In accordance with the present embodiment, any of the transmission terminals 10aa, 10ab, ..., 10db may be referred to as "the transmission terminal 10". Any of the displays 120aa, 120ab, ..., 120db may be referred to as "the display 120". Any of the relay apparatuses 30a, 30b, 30c, and 30d may be referred to as "the relay apparatus 30".

The transmission terminal 10 may transmit or receive video data or audio data to or from another transmission terminal 10. In accordance with the present embodiment, the video data may include a moving image or a still image, or both. The relay apparatus 30 relays video data and audio data between plural transmission terminals 10. The transmission managing system 50 centrally manages the transmission terminal 10 and the relay apparatus 30.

An external input apparatus 40 is connected to the transmission terminal 10 and transmits display data for displaying material data to the transmission terminal 10. The "material data" may include data that is utilized by document creating software, spreadsheet software, or presentation software.

Routers 70a, 70b, ..., 70f select optimum routes for the video data and audio data. In accordance with the present embodiment, any of the routers (70a, 70b, ..., 70f) may be referred to as "the router 70". The program providing system 90 includes a HD (Hard Disk; not illustrated) for storing a transmission terminal program for realizing various functions or units of the transmission terminal 10. The transmission terminal program may be transmitted to the transmission terminal 10. The HD of the program providing system 90 also stores a relay apparatus program for realizing various functions or units of the relay apparatus 30. The relay apparatus program may be transmitted to the relay apparatus 30. Further, the HD of the program providing system 90 also stores a transmission managing program for realizing various functions or units of the transmission managing system 50. The transmission managing program may be transmitted to the transmission managing system 50.

The transmission terminal 10aa, the transmission terminal 10ab, the relay apparatus 30a, and the router 70a are communicatively connected to each other via a LAN 2a. The transmission terminal 10ba, the transmission terminal 10bb, the relay apparatus 30b, and the router 70b are communicatively connected to each other via a LAN 2b. The LAN 2a and the LAN 2b are communicatively connected via a dedicated line tab including the router 70c and are located in a predetermined area A. The area A may cover a country, such as Japan. In this case, the LAN 2a may be located in a local office, such as one in Tokyo; the LAN 2b may be provided in another local office, such as one in Osaka.

The transmission terminal 10ca, the transmission terminal 10cb, the relay apparatus 30c, and the router 70d are communicatively connected via a LAN 2c. The transmission terminal 10da, the transmission terminal 10db, the relay apparatus 30d, and the router 70e are communicatively connected via a LAN 2d. The LAN 2c and the LAN 2d are communicatively connected via a dedicated line 2cd including the router 70f and are located within a predetermined area B. The area B may cover another country, such as the United States of America. In this case, the LAN 2c may be located in a local office, such as one in New York; the LAN 2d may be located in another local office, such as one in Washington D.C. The areas A and B are communicatively connected by the Internet 2*i* via the routers 70*c* and 70*f*.

The transmission managing system 50 and the program providing system 90 are communicatively connected with the transmission terminal 10 and the relay apparatus 30 via the Internet 2*i*. The transmission managing system 50 and the program providing system 90 may be located in the area A or B, or in another area.

In accordance with the present embodiment, the LAN 2*a*, the LAN 2*b*, the dedicated line 2*ab*, the Internet 2*i*, the dedicated line 2*cd*, the LAN 2*c*, and the LAN 2*d* constitute a communication network 2.

In FIG. 1, a set of four numbers indicated below the transmission terminal 10, the relay apparatus 30, the transmission managing system 50, the router 70, and the program providing system 90 indicates an IP address according to IPv4 in a simplified way. For example, the IP address of the transmission terminal 10*aa* is "1.2.1.3". Preferably, IPv6 may be used instead of IPv4.

Hardware Structure of Embodiment

Figure 2:
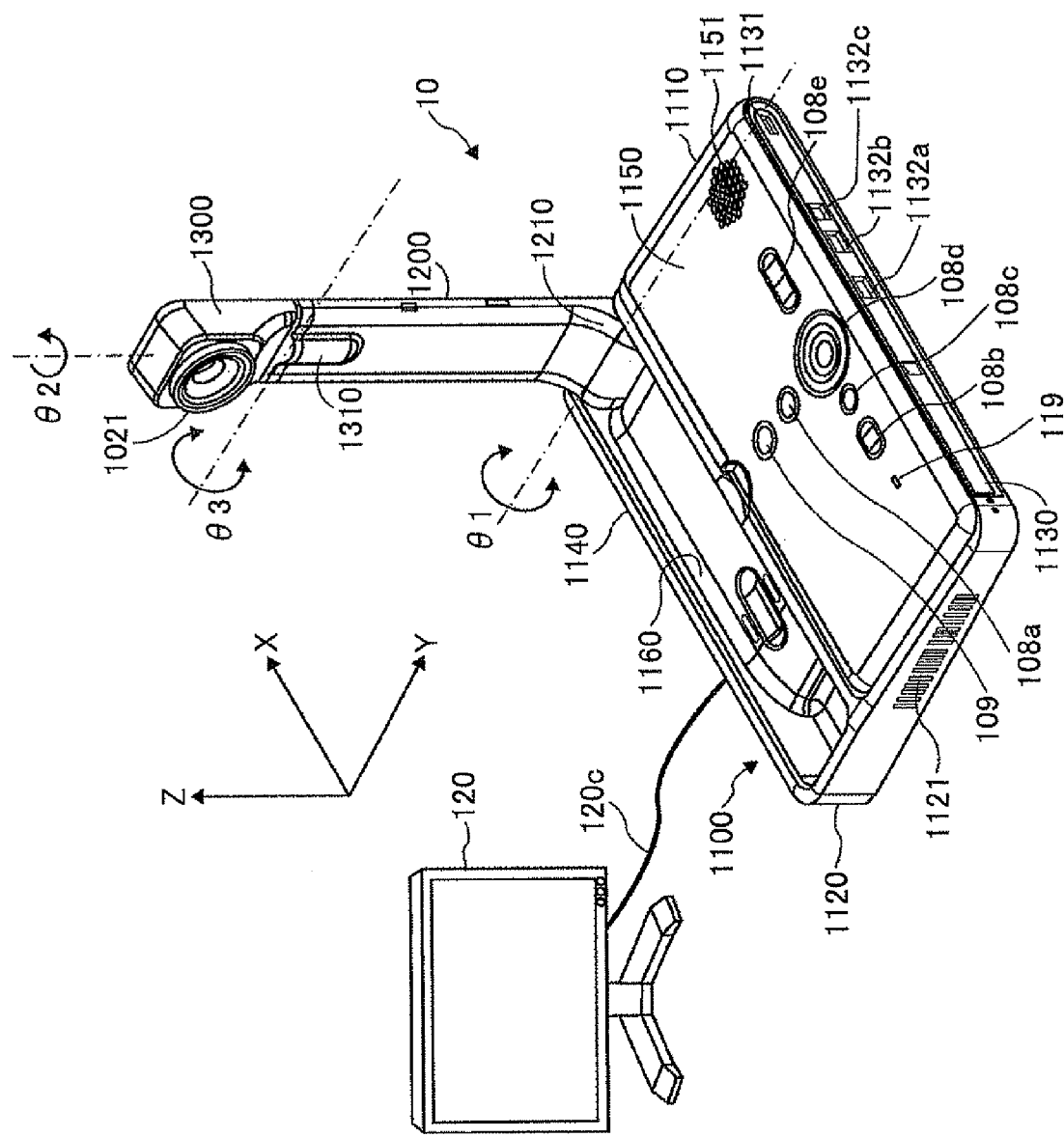
FIG. 2 is a perspective view of a transmission terminal according to the present embodiment.

A hardware structure according to the present embodiment is described. In accordance with the present embodiment, when a delay is caused upon reception of image data at the transmission terminal 10 as a relayed destination, the resolution of the image of the imade data is varied by the relay apparatus 30 before transmitting the image data to the transmission terminal 10 as the relayed destination. FIG. 2 is a perspective view of the transmission terminal 10 according to the present embodiment. In the following description, the lengthwise direction of the transmission terminal 10 is referred to as the X-axis direction; a direction perpendicular to the X-axis direction in a horizontal plane is referred to as the Y-axis direction; and a direction perpendicular to the X-axis direction and the Y-axis direction is referred to as the Z-axis direction (vertical direction).

As illustrated in FIG. 2, the transmission terminal 10 includes a casing 1100, an arm 1200, and a camera housing 1300. The casing 1100 has a front-side wall surface 1110 which includes an air-inlet surface (not illustrated) including plural air-inlet openings. The casing 1100 also includes a rear-side wall surface 1120 that includes an exhaust surface 1121 having plural exhaust openings. Thus, outside air to the front of the transmission terminal 10 may be collected via the air-inlet surface (not illustrated) by operating a cooling fan (not illustrated) provided in the casing 1100 and then let out to the rear of the transmission terminal 10 via the exhaust surface 1121. The casing 1100 has a right-side wall surface 1130 having a sound-pickup opening 1131 via which sound, such as voice or noise, can be picked up by a built-in microphone 114, which will be described later.

An operating panel 1150 is formed on an upper surface of the casing 1100 on the side of the right-side wall surface 1130. The operating panel 1150 may include plural operating buttons 108*a* through 108*e*, a power switch 109, an alarm lamp 119, and an audio output surface 1151. The audio-output surface 1151 may include plural audio output openings for letting out sound from a built-in speaker 115 (see FIG. 3). On the side of a left-side wall surface 1140 of the casing 1100, there is formed a container portion 1160 which may include cavities for accommodating the arm 1200 and the camera housing 1300. In the right-side wall surface 1130 of the casing 1100, there are formed plural connecting openings 1132*a* through 1132*c* for electrical connection of cables to an external device connecting I/F 118. In the left-side wall surface 1140 of the casing 1100, there is formed a connecting opening (not illustrated) for electrical connection of a cable 120*c* from a display 120 to the external device connecting I/F 118. In the following description, any of the operating buttons 108*a* through 108*e* may be referred to as "the operating button 108". Any of the connecting openings 1132*a* through 1132*c* may be referred to as "the connecting opening 1132".

The arm 1200 may be attached to the casing 1100 via a torque hinge 1210 allowing the arm 1200 to be rotated up or down with respect to the casing 1100 in a range of a tilt angle θ1 of 135°, for example. FIG. 2 illustrates the arm 1200 rotated up to the tilt angle θ1 of 90°.

The camera housing 1300 houses the built-in camera 1021 with which an object, such as a person, a document, or a room, may be imaged. The camera housing 1300 is attached to the arm 1200 via a torque hinge 1310 allowing the camera housing 1300 to be rotated vertically and horizontally with respect to the arm 1200. Specifically, the camera housing 1300 may be rotated in a range of a panning angle θ2 of ±180° and a range of a tilt angle θ3 of ±45° from the 0° position of the camera housing 1330 illustrated in FIG. 2.

The exteriors of the relay apparatus 30, the managing system 50, and the program providing system 90 are not illustrated because they may be similar to those of general servers or computers.

Figure 3:
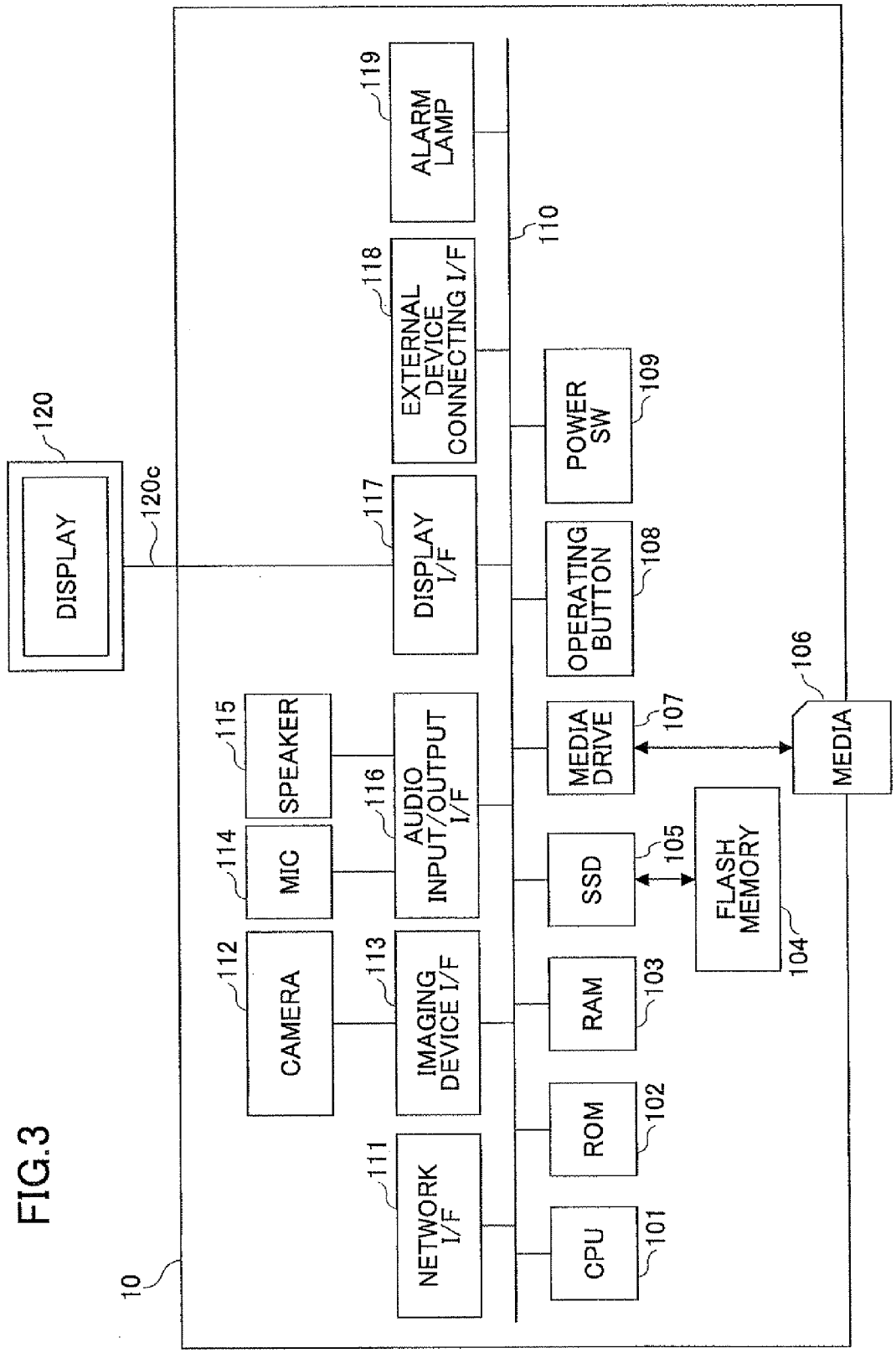
FIG. 3 is a block diagram of a hardware structure of the transmission terminal.

FIG. 3 is a block diagram illustrating a hardware structure of the transmission terminal 10. As illustrated, the transmission terminal 10 includes a CPU (Central Processing Unit) 101 for controlling the operation of the transmission terminal 10 as a whole; a ROM (Read Only Memory) 102 which may store the transmission terminal program; a RAM (Random Access Memory) 103 which may be used as a work area for the CPU 101; a flash memory 104 which may store various data such as video data and audio data; a SSD (Solid State Drive) 105 which may control reading or writing of various data from or into the flash memory 104 under the control of the CPU 101; a media drive 107 for controlling the reading or writing (i.e., storage) of data from or into a recording medium 106 such as a flash memory; an operating button 108 which may be operated when selecting an address of the transmission terminal 10; a power switch 109 for turning on or off the transmission terminal 10; a network I/F 111 for transmitting data by utilizing the communication network 2; a CCD (Charge Coupled Device) 112 for imaging an object under the control of the CPU 101; an imaging element I/F 113 for controlling the operation of the camera 112; a microphone 114 for picking up sound; a speaker 115 for providing an audio output; an audio input/output I/F 116 for processing the input and output of an audio signal between the microphone 114 and the speaker 115 under the control of the CPU 101; a display I/F 117 for transmitting video data to the external display 120; an external unit I/F 118 for transmitting or receiving various data to or from the external apparatus; an alarm lamp 119 for indicating abnormality in any of the functions of the terminal 10; and a bus line 110, which may include an address bus and a data bus, for electrically connecting the various constituent elements as illustrated in FIG. 3.

The display 120, which may include an LCD or organic EL (electroluminescence) display unit, displays an image of an object or operating icons. The display 120 is connected to the display I/F 117 via the cable 120*c*. The cable 120*c* may include cables for an analog RGB (VGA) signal, a component video signal, a HDMI (High-Definition Multimedia Interface) signal, or a DVI (Digital Video Interactive) signal, for example. The camera 112 may include a lens and a solid-state image sensing element for converting light into electric charges so as to obtain an electric signal of an object image (picture). The solid-state image sensing element may include a CMOS (Complementary Metal Oxide Semiconductor) or a CCD (Charge Coupled Device).

To the external device connecting I/F 118, external devices, such as an external camera, an external microphone, or an external speaker may be electrically connected via a USB (Universal Serial Bus) cable inserted into the connecting opening 1132 of the casing 1100 illustrated in FIG. 2. When the external camera is connected, the external camera may be activated with priority over the built-in camera 112 under the control of the CPU 101. Similarly, when the external microphone or the external speaker is connected, they may be activated with priority over the built-in microphone 114 or the built-in speaker 115, respectively, under the control of the CPU 101.

The recording medium 106 may be freely attached to or detached from the transmission terminal 10. The flash memory 104 is merely an example of a non-volatile memory. Any non-volatile memory, such as an EEPROM (Electrically Erasable and Programmable ROM), capable of reading or writing data under the control of the CPU 101 may be used. The transmission terminal program may be recorded in a computer-readable recording medium, such as the recording medium 106, in a file of an installable or executable format.

Figure 4:
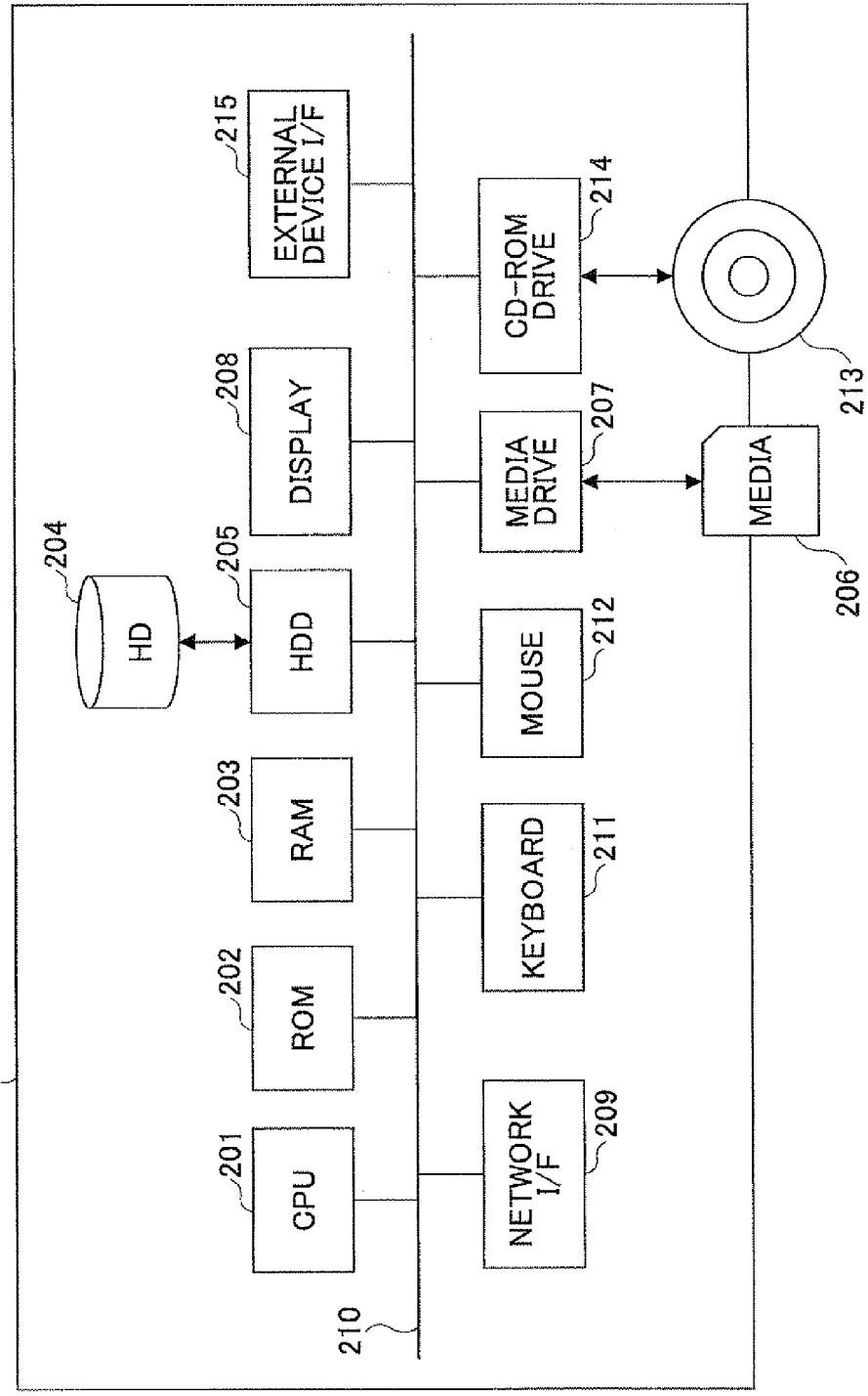
FIG. 4 is a block diagram of a hardware structure of a transmission managing system, a relay apparatus, a program providing server, or an external input apparatus according to the present embodiment.

FIG. 4 illustrates a hardware structure of the transmission managing system 50 according to the present embodiment. The transmission managing system 50 includes a CPU 201 for controlling the operation of the transmission managing system 50 as a whole; a ROM 202 storing the transmission managing program; a RAM 203 used as a work area for the CPU 201; a HD (Hard Disk) 204 storing various data; a HDD (Hard Disk Drive) 205 controlling the reading or writing of various data from or into the HD 204 under the control of the CPU 201; a media drive 207 controlling the reading or writing (storing) of data from or into the recording medium 206 which may include a flash memory; a display 208 displaying various information items such as a cursor, a menu, a window, characters, or images; a network I/F 209 for data transmission utilizing the communication network 2; a keyboard 211 having plural keys for inputting characters, values, or various instructions; a mouse 212 for selecting or activating various instructions, selecting a processing target, or moving the cursor; a CD-ROM drive 214 for controlling the reading or writing of data from or into the CD-ROM (Compact Disc Read Only Memory) 213 as an example of a detachable recording medium; an external unit I/F 215 for transmitting or receiving information to or from the external apparatus; and a bus line 210 which may include an address bus and a data bus for electrically connecting the various constituent elements to one another, as illustrated in FIG. 4.

The transmission managing program may be recorded in a computer-readable recording medium such as the recording medium 206 or the CD-ROM 213 in a file of an installable or executable format for distribution. The external input apparatus 40 may have a hardware structure similar to that of the transmission managing system 50. However, the ROM 202 stores an external input apparatus program for controlling the external input apparatus 40. The external input apparatus program may be recorded in the recording medium 206 or the CD-ROM 213 in a file of an installable or executable format for distribution.

The relay apparatus 30 may have a hardware structure similar to that of the transmission managing system 50. However, the ROM 202 stores a relay apparatus program for controlling the relay apparatus 30. The relay apparatus program may be recorded in the recording medium 206 or the CD-ROM 213 in a file of an installable or executable format for distribution.

The program providing system 90 may have a hardware structure similar to that of the transmission managing system 50. However, the ROM 202 stores a program providing program for controlling the program providing system 90. The program providing program may be recorded in the recording medium 206 or the CD-ROM 213 in a file of an installable or executable format for distribution.

The maintenance system 100 may include a computer configured to maintain or manage the terminal 10, the relay apparatus 30, the managing system 50, and/or the program providing system 90. For example, when the maintenance system 100 is provided in one country while the terminal 10, the relay apparatus 30, the managing system 50, or the program providing system 90 is provided in another country, the maintenance system 100 may perform a maintenance operation for maintaining or managing at least one of the terminal 10, the relay apparatus 30, the managing system 50, the authentication system 80, and the program providing system 90 via the communication network 2. The maintenance system 100 may maintain or manage information of a model type number, a manufacturing number, a sales destination, maintenance and inspection, or a failure history of at least one of the terminal 10, the relay apparatus 30, the managing system 50, and the program providing system 90 without using the communication network 2.

The program providing system 90 and the maintenance system 100 may have a hardware structure similar to that of the managing system 50. The HD 204 may record the program providing program for controlling the program providing system 90. The program providing program may be recorded in a computer-readable recording medium such as the recording medium 206 or the CD-ROM 213 in a file of an installable or executable format for distribution. Alternatively, the program providing program may be stored in the ROM 202 instead of the HD 204. The computer-readable recording medium may include detachable recording media such as a CD-R (Compact Disc Recordable), a DVD (Digital Versatile Disk), and a Blu-ray disc.

Functional Structure of Embodiment

Figure 5:
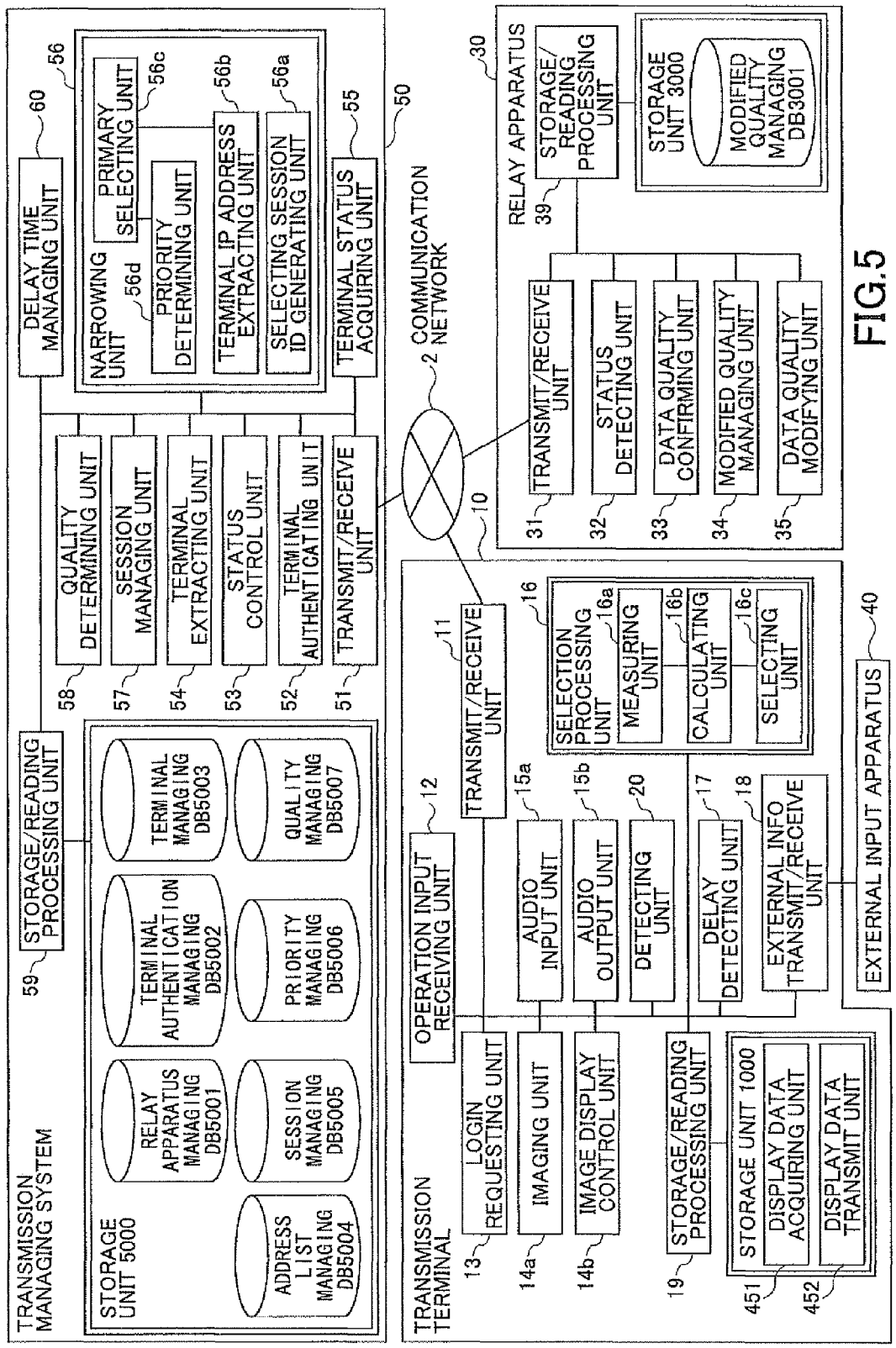
FIG. 5 is a functional block diagram of the transmission terminal, the relaying apparatus, the external input apparatus, and the transmission managing system of the transmission system according to the present embodiment.

FIG. 5 is a functional block diagram of the transmission system 1 according to the present embodiment. In FIG. 5, the transmission terminal 10, the relay apparatus 30, and the transmission managing system 50 are connected to one another via the communication network 2 in a data-communicative manner. The external input apparatus 40 is connected to the transmission terminal 10 in a data-communicative manner. A functional block diagram of the external input apparatus 40 constituting the transmission system 1 according to the present embodiment is illustrated in FIG. 24. The program providing system 90 of FIG. 1 is not illustrated in FIG. 5 because the program providing system 90 is not directly relevant to communications for a video conference.

Functional Structure of Transmission Terminal

Referring to FIG. 5, the transmission terminal 10 includes a transmitting/receiving unit 11; an operating input receiving unit 12; a login request unit 13; an imaging unit 14a; an image display control unit 14b; an audio input unit 15a; an audio output unit 15b; a selection processing unit 16; a delay detecting unit 17; an external information transmitting/receiving unit 18; and a storage/read processing unit 19. The functions of these units may be provided by operating the constituent elements illustrated in FIG. 3 in accordance with an instruction from the CPU 201 according to a program stored in the ROM 202. The transmission terminal 10 also includes a storage unit 1000 which may include the SSD 105 illustrated in FIG. 3.

Functional Units of Transmission Terminal

The various portions of the transmission terminal 10 are described in detail. The transmitting/receiving unit 11, which may be realized by the network I/F 111 of FIG. 3, transmits or receives various data (information) to or from another terminal, apparatus, or system via the communication network 2. The operating input receiving unit 12, which may be realized by the operating button 108 and the power switch 109 of FIG. 3, receives various inputs from a user. For example, when the user turns on the power switch 109 of FIG. 3, the operating input receiving unit 12 of FIG. 5 receives a power-on signal and turns on the transmission terminal 10. The login request unit 13 may be realized in accordance with an instruction from the CPU 101 of FIG. 3. In response to the reception of the power-on signal, the login request unit 13 may automatically transmit login request information and a current IP address of the transmission terminal 10ab to the transmission managing system 50 via the transmitting/receiving unit 11 and the communication network 2.

Still referring to FIG. 5, the imaging unit 14a, which may be realized by the camera 112 and the imaging element I/F 113 of FIG. 3, images an object and outputs resultant video data. The image display control unit 14b, which may be realized by the display I/F 117 of FIG. 3, may control the transmission of video data to the external display 120. The audio input unit 15a, which may be realized by the microphone 114 and the audio input/output I/F 116 of FIG. 3, may convert a user's voice into an audio signal, thereby outputting audio data. The audio output unit 15b, which may be realized by the speaker 115 and the audio input/output I/F 116 of FIG. 3, may convert the audio signal into actual sound, thus producing an audio output.

The selection processing unit 16, in order to perform a final narrowing process for narrowing the plural relay apparatuses 30 down to one selected relay apparatus 30, may realize a measuring unit 16a, a calculating unit 16b, and a selecting unit 16c in response to an instruction from the CPU 101 of FIG. 3. The measuring unit 16a measures a receive date/time of reception of pre-transmit information by the transmitting/receiving unit 11 each time the pre-transmission information is received by the transmitting/receiving unit 11 as will be described later. The calculating unit 16b calculates a required time between the transmission and reception of the pre-transmit information based on a difference between the receive time measured by the measuring unit 16a and the transmit date/time included in the pre-transmit information, for each item of the pre-transmit information of which the receive date/time is measured by the measuring unit 16a. The selecting unit 16c selects the one of the relay apparatuses 30 that has relayed the pre-transmission information with the minimum of the required times calculated by the final calculating unit 16b.

The delay detecting unit 17, which may be realized in response to an instruction from the CPU 101 of FIG. 3, may detect a delay time (ms) of the video data or audio data sent from the other transmission terminal 10 via the relay apparatus 30. The external information transmitting/receiving unit 18 may transmit or receive data to or from the external apparatus 40 using the external unit I/F 215. The storage/read processing unit 19, which may be provided by the SSD 105 of FIG. 3, may process the reading or writing of various data from or into the storage unit 1000. The storage unit 1000 may store a terminal ID identifying the transmission terminal 10 and a corresponding password, a relay apparatus ID identifying the relay apparatus 30 via which video data, audio data, and various data may be transmitted, and an IP address of a destination terminal. The storage unit 1000 may also store a display data acquiring unit 451 and a display data transmitting unit 452 that may be transmitted to the external input apparatus 40 and operated therein. The display data acquiring unit 451 enables the acquisition of display data by the external input apparatus 40. The display data transmitting unit 452 enables the transmission of the display data acquired by the display data acquiring unit 451 to the transmission terminal 10. The display data may include video data of an image displayed on a screen of a display apparatus in JPEG (Joint Photographic Experts Group) or Bitmap format, or a drawing command of the image in GDI (Graphics Device Interface) format.

The terminal ID and the relay apparatus ID, which will be described later, may include various information items uniquely identifying the transmission terminal 10 and the relay apparatus 30, respectively. The identifying information may include a language, a character, a sign, or a symbol. At least two of these information items, i.e., a language, a character, a sign, and a symbol may be used in combination. In the following description, the transmission terminal 10 as a request source that requests the start of a video conference is referred to as the "request source terminal 10A", while the transmission terminal 10 to which the request is sent may be referred to as the "destination terminal 10B".

Material Managing Table

The storage unit 4000 includes a material managing DB 4001 which may be in the form of a material managing table illustrated in FIG. 24. The material managing table manages the name and size of a material, the name of application software used for creating the material, the date/time of last update of the material, and material data in association with one another.

Functional Structure of External Input Apparatus

The external input apparatus 40, as illustrated in FIG. 24, includes a transmitting/receiving unit 41, a connection detecting unit 42, an install determination unit 43, a program acquiring unit 44, an operating input receiving unit 46, a display control unit 47, a mount unit 48, and a storage/read processing unit 49. These units may be provided by operating the constituent elements illustrated in FIG. 4 in accordance with an instruction from the CPU 201 according to a program stored in the ROM 202. The external input apparatus 40 also includes a storage unit 4000 which may be provided by the HDD 205 of FIG. 4. The external input apparatus 40 may include an operating system (OS), such as a Microsoft Windows OS™ available from Microsoft Corp., which may provide the function of executing a program upon connection with another apparatus.

Material Managing Table

The storage unit 400 may include a material managing DB 4001 which may be in the form of a material managing table (not illustrated). The material managing table may manage a material name, a material size, a name of an application used for creating the material, the date/time of the last update of the material, and material data in association with one another.

Functional Units of External Input Apparatus

The various units of the external input apparatus 40 are described. The transmitting/receiving unit 41, which may be realized by the network I/F 209 of FIG. 4, may process the transmission and reception of various data (information) to or from the transmission terminal 10. The connection detecting unit 42 may detect when the transmission and reception of data to or from the external unit is enabled by the external unit input/output I/F 215. The install determination unit 43 may determine whether the display data acquiring unit 451 or the display data transmitting unit 452 is installed in the external input apparatus 40. The program acquiring unit 44 may acquire, from the storage unit 1000 of the transmission terminal 10 connected via the transmitting/receiving unit 41, the display data acquiring unit 451 and the display data transmitting unit 452, and install them. The operating input receiving unit 46 may receive an input based on a user operation. The display control unit 47 may cause an image read by the storage/read processing unit 49 to be displayed on the display apparatus 400. The mount unit 48 may mount storage units of various apparatuses connected to the external input apparatus 40. The storage/read processing unit 49, which may be provided by the HDD 205 of FIG. 4, may process the storing of various data in the storage unit 4000 or the reading of various data from the storage unit 4000. The storage unit 4000 may store the material data and the like.

Functional Structure of Relay Apparatus

Referring to FIG. 5, the relay apparatus 30 includes a transmitting/receiving unit 31, a status detecting unit 32, a data quality confirming unit 33, a modified quality managing unit 34, a data quality modifying unit 35, and a storage/read processing unit 39. These units may be realized by operating the constituent elements illustrated in FIG. 4 in accordance with an instruction from the CPU 201 according to a program stored in the ROM 202. The relay apparatus 30 includes a storage unit 3000 which may be provided by the HD 204 illustrated in FIG. 4.

Modified Quality Managing Table

The storage unit 3000 includes a modified quality managing DB 3001 which may be in the form of a modified quality managing table illustrated in FIG. 7. The modified quality managing table of FIG. 7 manages the image quality of video data relayed by the relay apparatus 30 to the transmission terminal (relayed destination) in association with the IP address of the transmission terminal 30.

Figure 6:
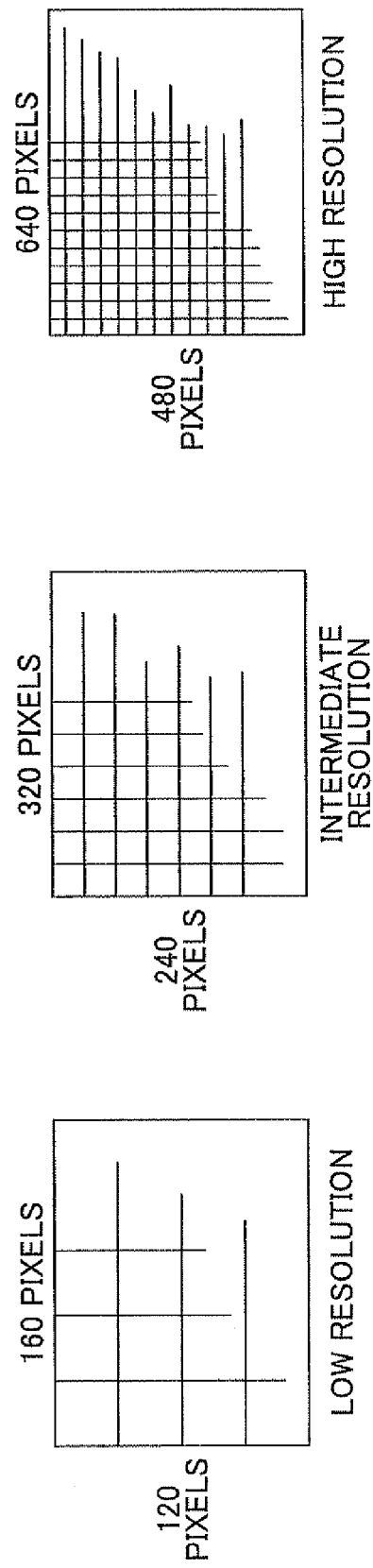
FIGS. 6A, 6B, and 6C illustrate images of various image qualities.

The resolution of video data handled according to the present embodiment is described. FIG. 6A illustrates a low-resolution image as a base image having 160 pixels horizontally times 120 pixels vertically. FIG. 6B illustrates an intermediate-resolution image having 320 pixels horizontally times 240 pixels vertically. FIG. 6C illustrates a high-resolution image having 640 pixels horizontally times 480 pixels vertically. When a narrow-band route is used, the low-quality video data of the low-resolution image may be relayed. When the band is relatively wide, intermediate-quality video data including the video data of the low-resolution video (base image) and the video data of the intermediate-resolution image may be relayed. When the band is very wide, high-quality video data including the low-resolution video data (base image quality), the intermediate-resolution video data, and the high-resolution video data may be relayed. For example, in the modified quality managing table of FIG. 7, when the relay apparatus 30 relays video data to the destination terminal 10db with the IP address "1.3.2.4", the image quality of the relayed video data is "high-quality".

Functional Units of Relay Apparatus

The functional structure of the relay apparatus 30 is described in detail. Reference may also be made to the constituent elements of FIG. 3 for realizing the units of the relay apparatus 30.

Referring to FIG. 5, the transmitting/receiving unit 31, which may be realized by the network I/F 209 of FIG. 4, may transmit or receive various data (information) to or from another terminal, apparatus, or system via the communication network 2. The status detecting unit 32, which may be realized in accordance with an instruction from the CPU 201 of FIG. 4, may detect an operating status of the relay apparatus 30. The operating status may include "online", "offline", and "failure".

The data quality confirming unit 33, which may be realized in accordance with an instruction from the CPU 201 of FIG. 4, may search the modified quality managing table (see FIG. 7) by using the IP address of the destination terminal 10B as a search key, and extract the image quality of corresponding relayed video data, thus confirming the image quality of the relayed video data. The modified quality managing unit 34, which may be realized in accordance with an instruction from the CPU 201 of FIG. 4, may modify the contents of the modified quality managing DB 3001 based on quality information sent from the transmission managing system 50, as will be described below.

For example, during a video conference in which high-quality video data is transmitted or received between the request source terminal 10aa with the terminal ID "01aa" and the destination terminal 10db with the terminal ID "01db", the terminal 10bb (request source) and the terminal 10ca (destination) may start another video conference via the communication network 2, resulting in a delay in receiving video data by the destination terminal 10db. In this case, the relay apparatus 30 may need to lower the image quality of the video data that has been relayed from high quality to intermediate quality. In such a case, the contents of the modified quality managing DB 3001 may be modified based on the quality information indicating the intermediate image quality, so that the image quality of the video data relayed by the relay apparatus 30 can be lowered from high-quality to intermediate quality.

The data quality modifying unit 35, which may be realized in response to an instruction from the CPU 201 of FIG. 4, may modify the image quality of the video data sent from the terminal 10 as the transmitting source, based on the modified content of the modified quality managing DB 3001. The storage/read processing unit 39, which may be realized by the HDD 205 of FIG. 4, may process the writing or reading of various data into or from the storage unit 3000.

Functional Structure of Transmission Managing System

Still referring to FIG. 5, the transmission managing system 50 includes a transmitting/receiving unit 51, a terminal authentication unit 52, a status managing unit 53, a terminal extracting unit 54, a terminal status acquiring unit 55, a narrowing unit 56, a session managing unit 57, a quality determining unit 58, a storage/read processing unit 59, and a delay time managing unit 60. These units may be realized by operating the constituent elements of FIG. 4 in accordance with an instruction from the CPU 201 according to a program stored in the ROM 202. The transmission managing system 50 includes a storage unit 5000 which may be provided by the HD 204 of FIG. 4.

Relay Apparatus Managing Table

Referring to FIG. 5, the storage unit 5000 includes a relay apparatus managing DB 5001 which may be in the form of a relay apparatus managing table as illustrated in FIG. 8. The relay apparatus managing table stores and manages the operating status of the relay apparatus 30, the receive date/time of reception of status information indicating the operating status by the transmission managing system 50, the IP address of the relay apparatus 30, and the maximum data transmission rate (Mbps) of the relay apparatus 30 in association with the relay apparatus ID of the relay apparatus 30. For example, the relay apparatus managing table of FIG. 8 indicates that, for the relay apparatus 30a with the relay apparatus ID "111a", the operating status is "online", that the status information was received by the transmission managing system 50 on Nov. 10, 2009 at 13:00 p.m., the IP address of the relay apparatus 30a is "1.2.1.2", and the relay apparatus 30a has a maximum data transmission rate of 100 Mbps.

Terminal Authentication Managing Table

The storage unit 5000 also includes a terminal authentication managing DB 5002 which may be in the form of a terminal authentication managing table as illustrated in FIG. 9. The terminal authentication managing table manages a password in association with the terminal ID of each of the transmission terminals 10 managed by the transmission managing system 50. For example, the transmission terminal 10aa with the terminal ID "01aa" is associated with the password "aaaa".

Terminal Managing Table

The storage unit 5000 also includes a terminal managing DB 5003 which may be in the form of a terminal managing table as illustrated in FIG. 10. The terminal managing table manages the operating status of the transmission terminal 10, the receive date/time of reception of the login request information by the transmission managing system 50, and the IP address of the transmission terminal 10 in association with the terminal ID of the transmission terminal 10. For example, the terminal managing table indicates that, for the transmission terminal 10aa with the terminal ID "01aa", the operating status is "online", that the login request information was received by the transmission managing system 50 on Nov. 10, 2009 at 13:40 p.m., and that the IP address of the transmission terminal 10aa is "1.2.1.3".

Destination List Managing Table

The storage unit 5000 includes a destination list managing DB 5004 which may be in the form of a destination list managing table as illustrated in FIG. 11. The destination list managing table manages the terminal IDs of all candidates for the destination terminal 10B in association with the terminal ID of the request source terminal 10A that requests the start of a video conference. For example, the terminal IDs of the candidates (transmission terminals) for the destination terminal 10B to which a request for the start of a video conference may be sent from the request source terminal 10aa with the terminal ID "01aa" are the terminal IDs "01ab", "01ba", and "01db". The candidates for the destination terminal 10B may be updated by addition or deletion in response to an addition or deletion request from the request source terminal 10A to the transmission managing system 50.

Session Managing Table

The storage unit 5000 also includes a session managing DB 5005 which may be in the form of a session managing table as illustrated in FIG. 12. The session managing table manages, in association with the selection session ID used for executing a session for selecting the relay apparatus 30, the relay apparatus ID of the relay apparatus 30 used for relaying the video data or audio data; the terminal ID of the request source terminal 10A; the terminal ID of the destination terminal 10B; the delay time (ms) in receiving the video data by the destination terminal 10B; and the receive date/time of reception of delay information indicating the delay time by the transmission managing system 50 from the destination terminal 10B.

For example, the session managing table of FIG. 12 indicates that the relay apparatus 30a (with the relay apparatus ID "111a") that is selected in a session executed by using the selection session ID "se1" relays video data and audio data between the request source terminal 10aa with the terminal ID "01aa" and the destination terminal 10db with the terminal ID "01db", and that the delay time of the video data upon reception at the destination terminal 10db at 14:00 p.m. on Nov. 10, 2009, is 200 ms. Preferably, when a video conference is conducted between the two transmission terminals 10, the receive date/time of the delay information may be managed based on the delay information transmitted from the request source terminal 10A, instead of the destination terminal 10B. However, when a video conference is conducted among three or more transmission terminals 10, the receive date/time of the delay information may be managed based on the delay information transmitted from the transmission terminal 10 on the receiving end of video data and audio data.

Address Priority Managing Table

Further, the storage unit 5000 includes a priority managing DB 5006 which may be in the form of an address priority managing table as illustrated in FIG. 13. The illustrated address priority managing table manages the address priority by allocating various address priority points depending on the number of the "same" or "different" sections of the four sections of the dot address of the general IP address scheme according to IPv4.

For example, the address priority managing table of FIG. 13 indicates that, in the case of the IP address having the corresponding values ("same") in the three upper sections of the dot address, the address priority is "5". In the case of the IP address having corresponding values in the upper two sections of the dot address, the address priority is "3". In this case, correspondence (i.e., whether "same" or "different") of the value in the lowest dot address section is irrelevant to the priority point. In the case of the IP address having a corresponding value only in the upper-most section of the dot address, with the value in the second upper-most section not corresponding, the address priority is "1". In this case, correspondence of the values of the third highest section and the lowest section of the dot address is irrelevant to the priority point. In the case of the IP address where the value of the highest section of the dot address is not corresponding, the address priority is "0". In this case, correspondence of the values of the second-highest, the third-highest, and the lowest sections of the dot address is irrelevant to the priority point.

Transmission Rate Priority Managing Table

The priority managing DB 5006 in the storage unit 5000 may include a transmission rate priority managing table illustrated in FIG. 14. The transmission rate priority managing table manages a transmission rate priority depending on the value of the maximum data transmission rate (Mbps) of the relay apparatus 30. Specifically, the transmission rate priority has higher points for higher maximum data transmission rates. For example, the transmission rate priority managing table of FIG. 14 indicates that, when the maximum data transmission rate of the relay apparatus 30 is 1000 Mbps or higher, the transmission rate priority point is "5". When the maximum data transmission rate of the relay apparatus 30 is equal to or more than 100 Mbps and less than 1000 Mbps, the transmission rate priority point is "3". When the maximum data transmission rate of the relay apparatus 30 is equal to or more than 10 Mbps and less than 100 Mbps, the transmission rate priority point is "1". When the maximum data transmission rate of the relay apparatus 30 is less than 10 Mbps, the transmission rate priority point is "0".

Quality Managing Table

The storage unit 5000 further includes a quality managing DB 5007 which may be in the form of a quality managing table illustrated in FIG. 15. The illustrated quality managing table manages the image quality of the video data relayed by the relay apparatus 30 in association with the delay time (ms) of the video data in the request source terminal 10A or the destination terminal 10B.

Functional Units of Transmission Managing System

Still referring to FIG. 5, the functional units of the transmission managing system 50 are described in detail. Reference is also made to the constituent elements of FIG. 4 for realizing the units of the transmission managing system 50.

The transmitting/receiving unit 51, which may be provided by the network I/F 209 of FIG. 4, may transmit or receive various data (information) to or from another terminal, apparatus, or system via the communication network 2. The terminal authentication unit 52 may search the terminal authentication managing DB 5002 in the storage unit 5000 by using the terminal ID and password included in the login request information received via the transmitting/receiving unit 51 as search keys. Based on whether corresponding terminal ID and password are stored in the terminal authentication managing DB 5002, terminal authentication is performed. The status managing unit 53, in order to manage the operating status of the request source terminal 10A that has transmitted a login request, stores and manages the terminal ID of the request source terminal 10A, the operating status of the request source terminal 10A, the receive date/time of reception of the login request information by the transmission managing system 50 and the IP address of the request source terminal 10A in association with one another in the terminal managing table (see FIG. 11).

The terminal extracting unit 54 searches the destination list managing table (see FIG. 11) by using the terminal ID of the request source terminal 10A that made the login request as a key, and reads the terminal IDs of candidates for the destination terminal 10B that can communicate with the request source terminal 10A. The terminal extracting unit 54 also searches the destination list managing table (see FIG. 11) by using the terminal ID of the request source terminal 10A that made the login request as a key, and extracts the terminal ID of another request source terminal 10A that has registered the terminal ID of the request source terminal 10A as a candidate for the destination terminal 10B.

The terminal status acquiring unit 55, by using the terminal IDs of the candidates for the destination terminal 10B extracted by the terminal extracting unit 54 as a search key, searches the terminal managing DB table (see FIG. 10), and reads the operating status of each of the terminal IDs extracted by the terminal extracting unit 54. In this way, the terminal status acquiring unit 55 can acquire the operating status of each candidate for the destination terminal 10B that can communicate with the request source terminal 10A. Further, the terminal status acquiring unit 55 searches the terminal managing table (see FIG. 10) by using the terminal ID extracted by the terminal extracting unit 54 as a search key in order to acquire the operating status of the request source terminal 10A.

The narrowing unit 56 performs a primary narrowing process prior to the final narrowing process in order to support the final narrowing process for narrowing plural relay apparatuses 30 down to one selected relay apparatus 30. The narrowing unit 56 includes a selection session ID generating unit 56a, a terminal IP address extracting unit 56b, a primary selecting unit 56c, and a priority determining unit 56d. The selection session ID generating unit 56a generates a selection session ID used for a session for selecting the relay apparatus 30. The terminal IP address extracting unit 56b, based on the terminal ID of the request source terminal 10A included in the start requesting information transmitted from the request source terminal 10A, and the terminal ID of the destination terminal 10B, searches the terminal managing table (see FIG. 10) in order to extract the IP address of each of the corresponding transmission terminals 10. The primary selecting unit 56c selects the finally narrowed relay apparatus 30 by selecting the relay apparatus ID of the relay apparatus 30 whose operating status is "online" among the relay apparatuses 30 managed by the relay apparatus managing table (see FIG. 8).

The primary selecting unit 56c, based on the IP address of the request source terminal 10A and the IP address of the destination terminal 10B that have been extracted by the terminal IP address extracting unit 56b, searches the relay apparatus managing table (see FIG. 8) in order to determine whether the dot address of the IP address of each of the relay apparatuses 30 is the same as or different from the dot address of the IP address of each of the request source terminal 10A and the destination terminal 10B. Further, the primary selecting unit 56c narrows the relay apparatuses 30 down to two relay apparatuses 30 having the highest points in terms of integrated points integrating, for each relaying apparatus, the higher of the address priority points of the transmission terminals 10 and the transmission rate priority points. While in accordance with the present embodiment the two relay apparatuses 30 having higher points are selected, this is merely an example; three of more relay apparatuses 30 having higher points may be selected as long as the relay apparatuses 30 can be narrowed down.

The priority determining unit 56d, by referring to the priority managing table (see FIG. 13), determines the address priority points for each of the relay apparatuses 30 investigated by the primary selecting unit 56c. The priority determining unit 56d also, based on the maximum data transmission rate of each of the relay apparatuses 30 managed in the relay apparatus managing table (see FIG. 8), searches the priority managing table (see FIG. 14) in order to determine the transmission rate priority points for each of the relay apparatuses 30 narrowed down by the primary selecting unit 56c.

The session managing unit 57 stores the selection session ID generated by the selection session ID generating unit 56a, the terminal ID of the request source terminal, and the terminal ID of the destination terminal in association with one another in the session managing table of the storage unit 5000 (see FIG. 12). The session managing unit 57 also stores the relay apparatus ID of the relay apparatus 30 finally selected by the selecting unit 16c of the transmission terminal 10 in the session managing table (see FIG. 12) for each selection session ID.

Referring to FIG. 5, the quality determining unit 58 searches the quality managing table (see FIG. 15) by using the delay time as a search key in order to extract the image quality of the video data, thus determining the image quality of the video data to be relayed by the relay apparatus 30. The storage/read processing unit 59, which may be provided by the HDD 205 of FIG. 4, may process the writing or reading of various data into or from the storage unit 5000. The delay time managing unit 60 searches the terminal managing table (see FIG. 10) by using the IP address of the destination terminal 10B as a search key in order to extract the corresponding terminal ID. Further, the delay time managing unit 60 stores the delay time indicated by the delay information in a delay time field portion of a record including the extracted terminal ID in the session managing table (FIG. 12).

Processes and Operation

Figure 16:
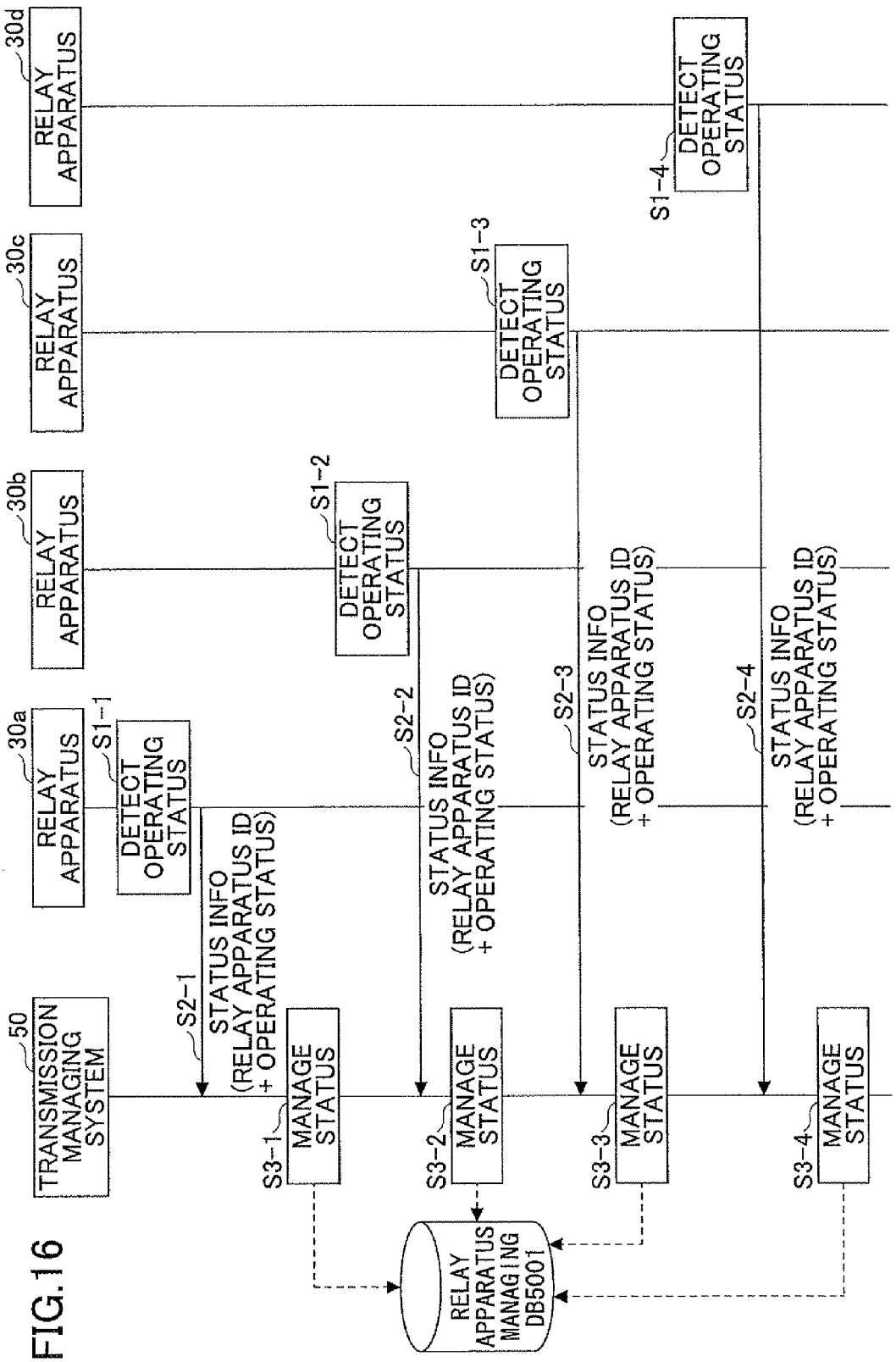
FIG. 16 is a sequence chart of a process of managing operating status information of relay apparatuses.
Figure 17:
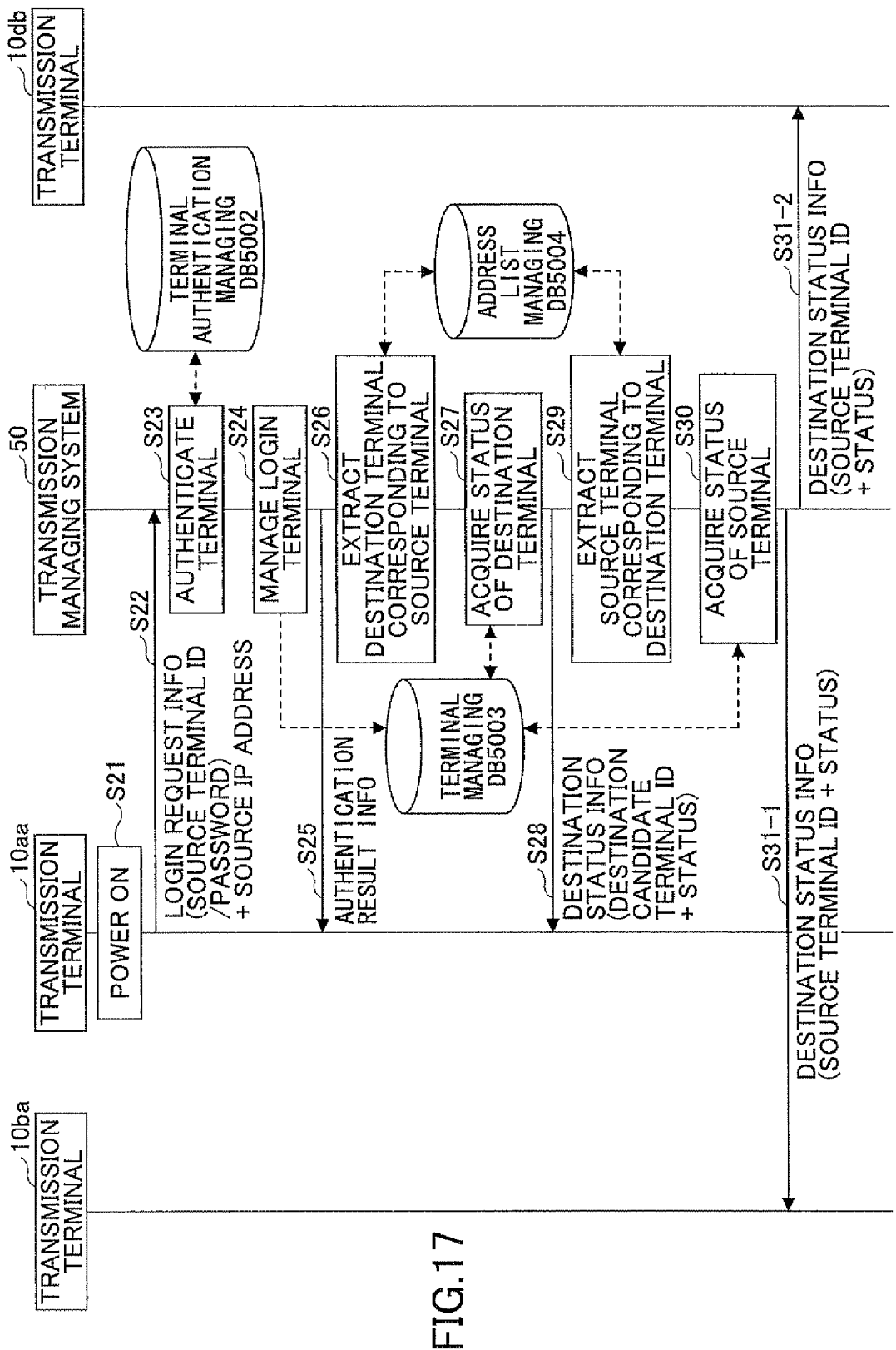
FIG. 17 is a sequence chart of preparatory-stage process performed prior to the start of communications between transmission terminals.
Figure 18:
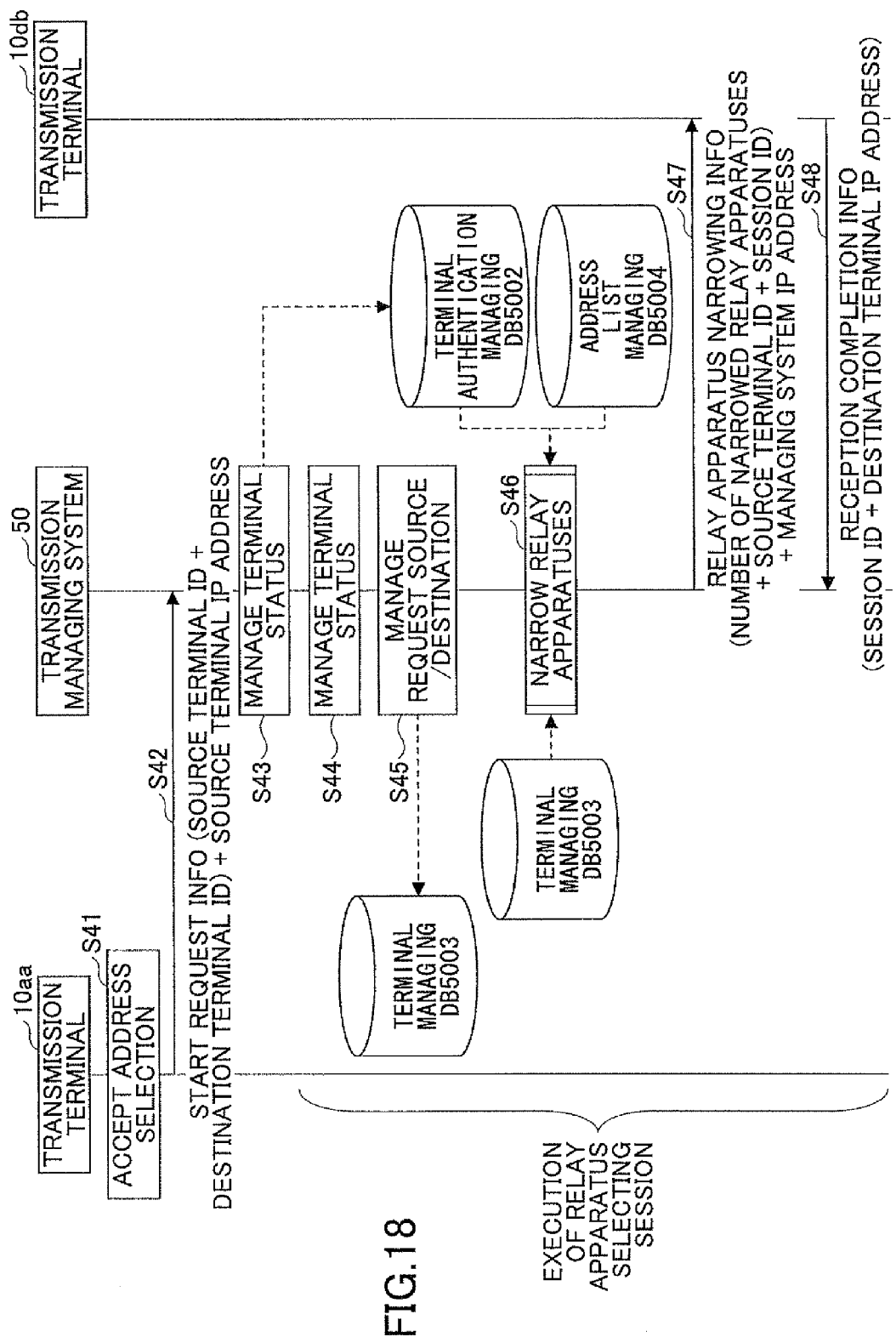
FIG. 18 is a sequence chart of a process of narrowing relay apparatuses.
Figure 19:
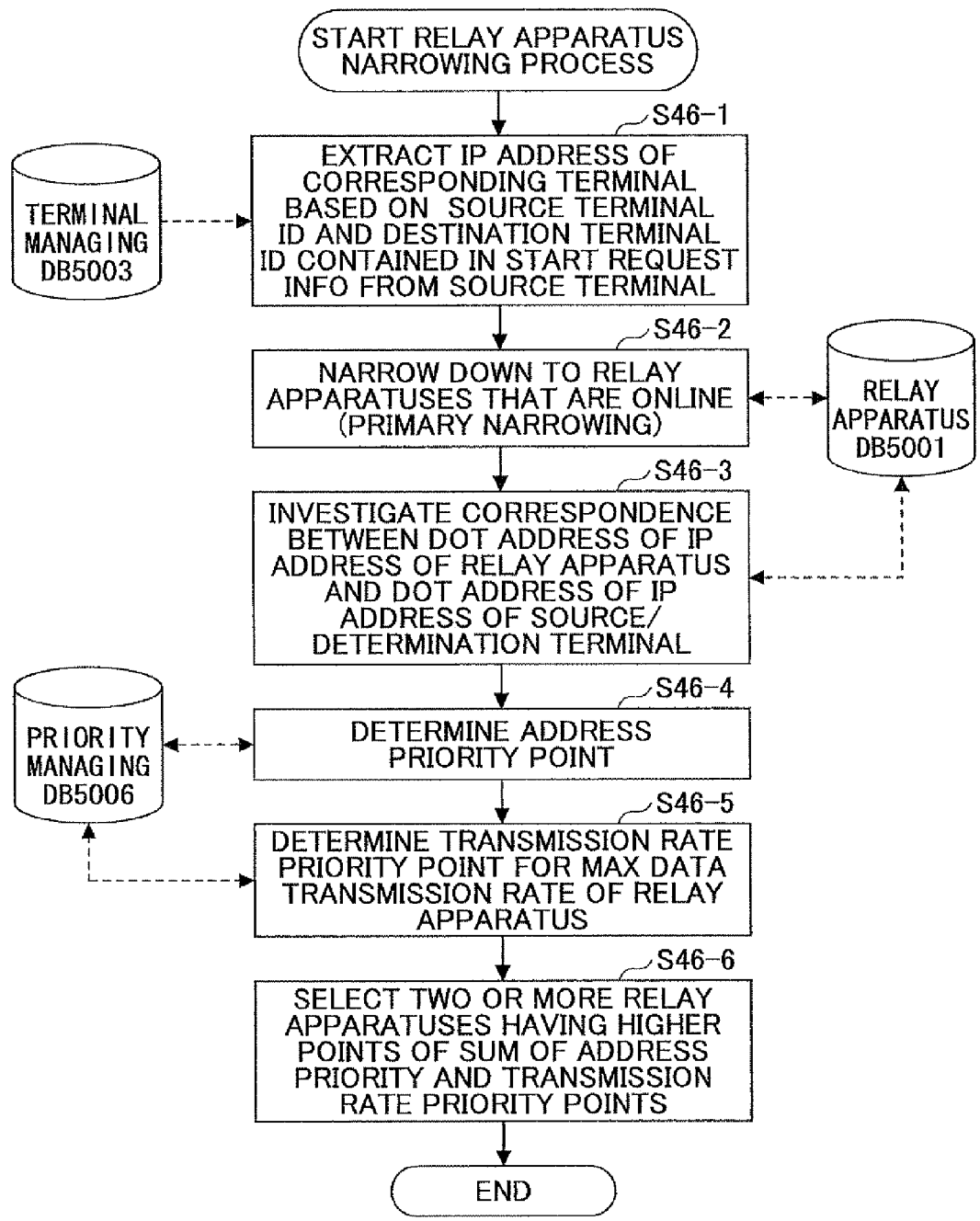
FIG. 19 is a flowchart of a process of narrowing the relay apparatuses.
Figure 21:
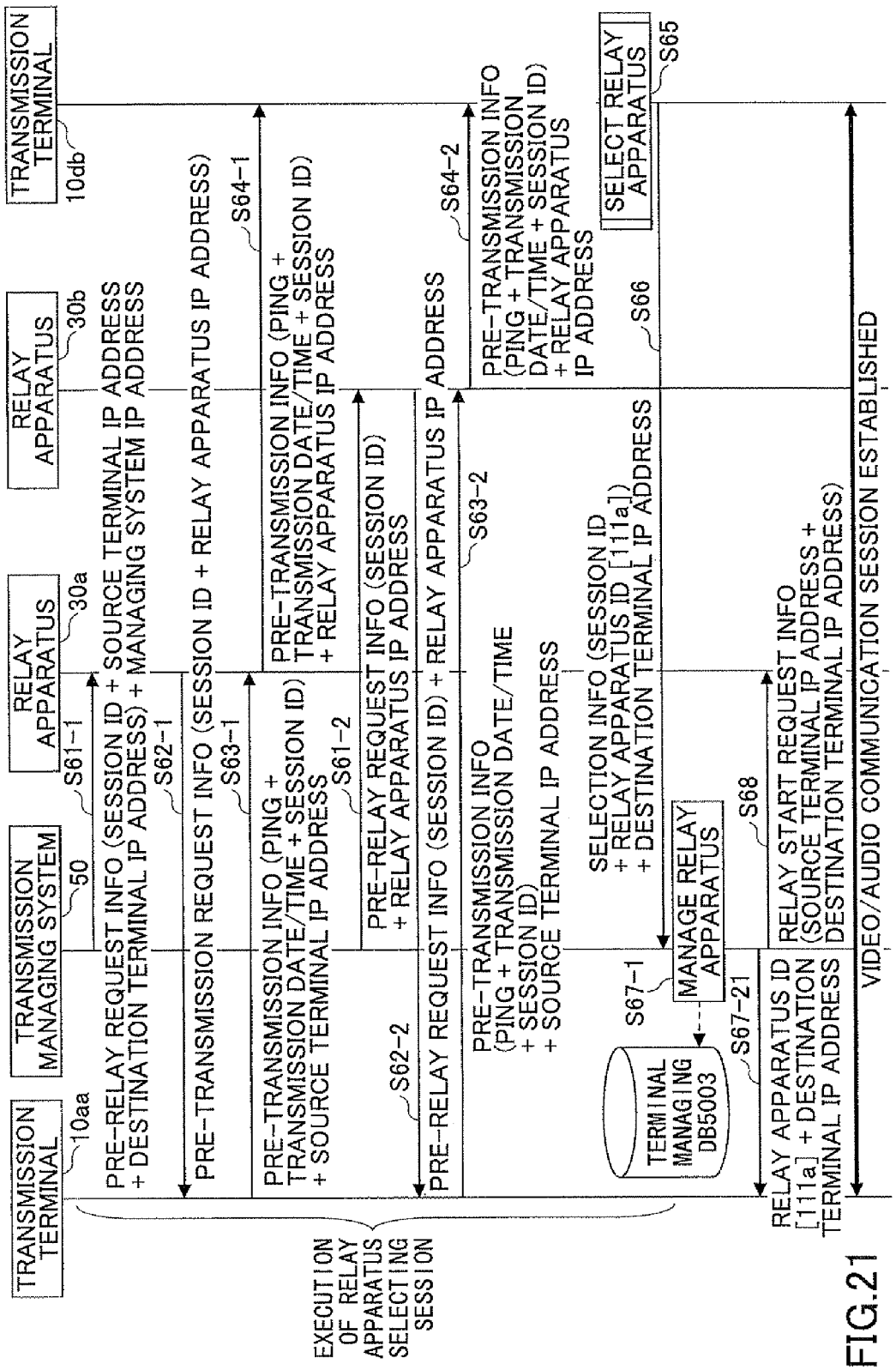
FIG. 21 is a sequence chart of a process of the transmission terminal selecting one of the relay apparatuses.
Figure 22:
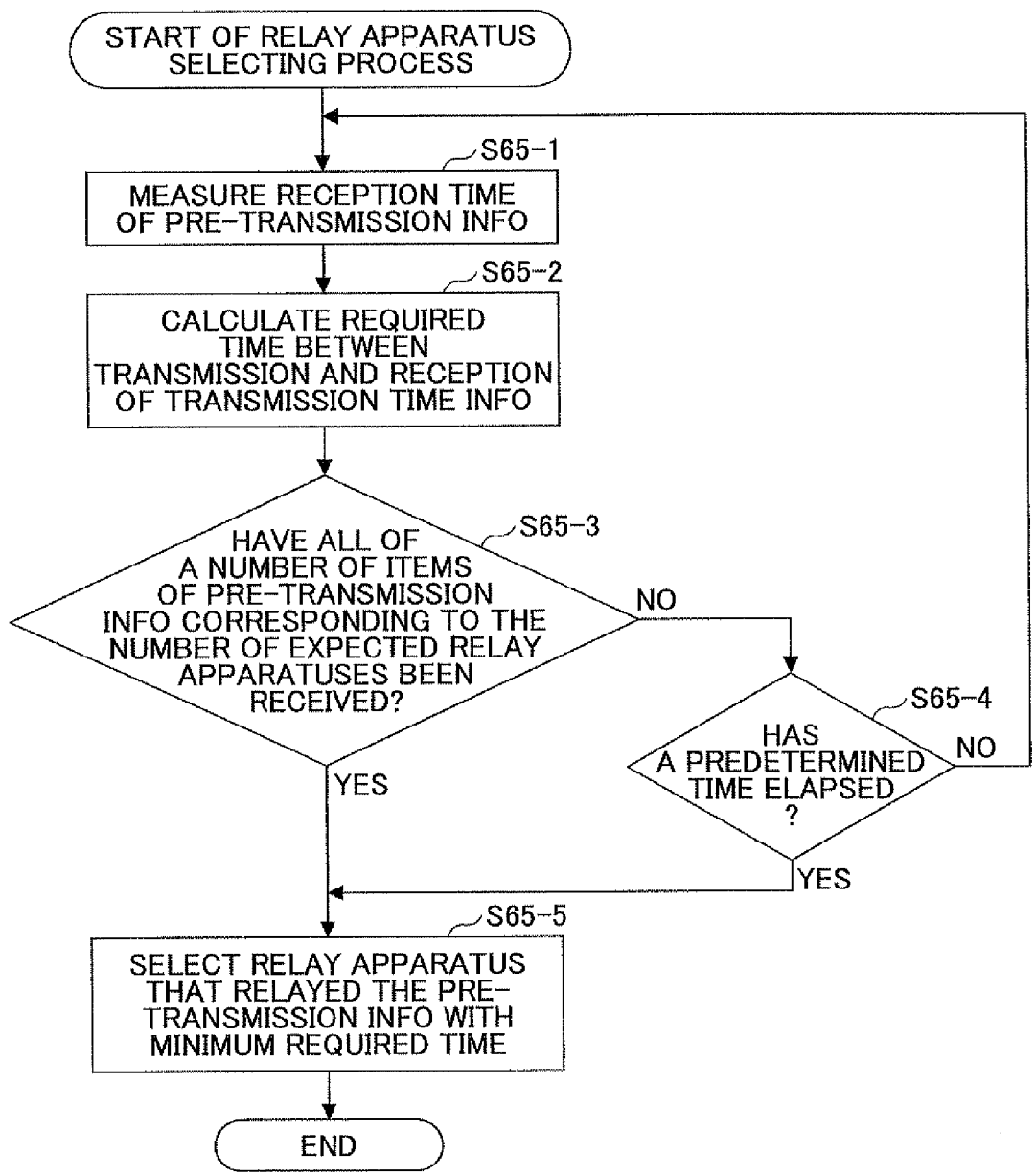
FIG. 22 is a flowchart of the process of the transmission terminal selecting one of the relay apparatuses.
Figure 23:
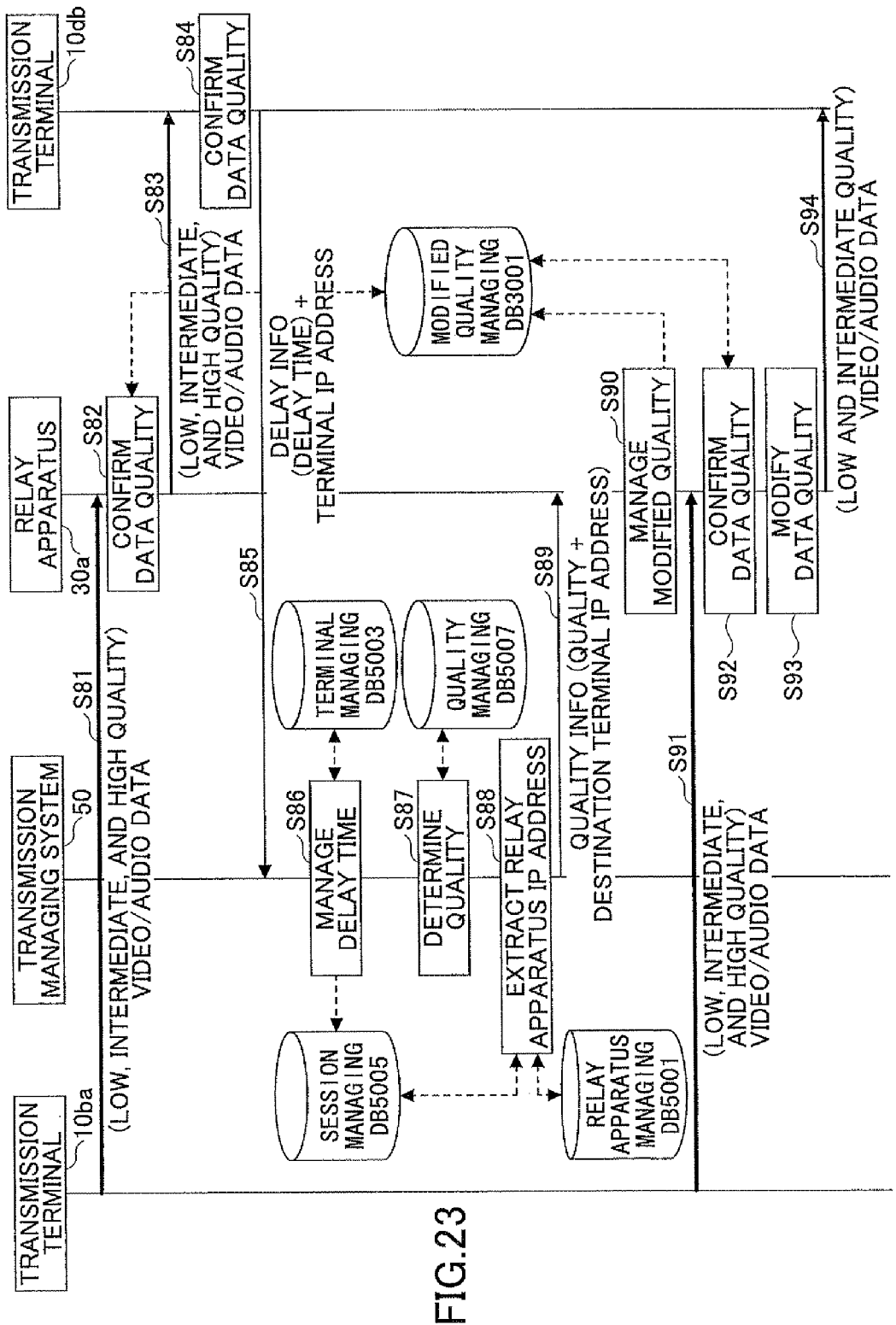
FIG. 23 is a sequence chart of a process of transmitting and receiving video data and audio data between transmission terminals.
Figure 25:
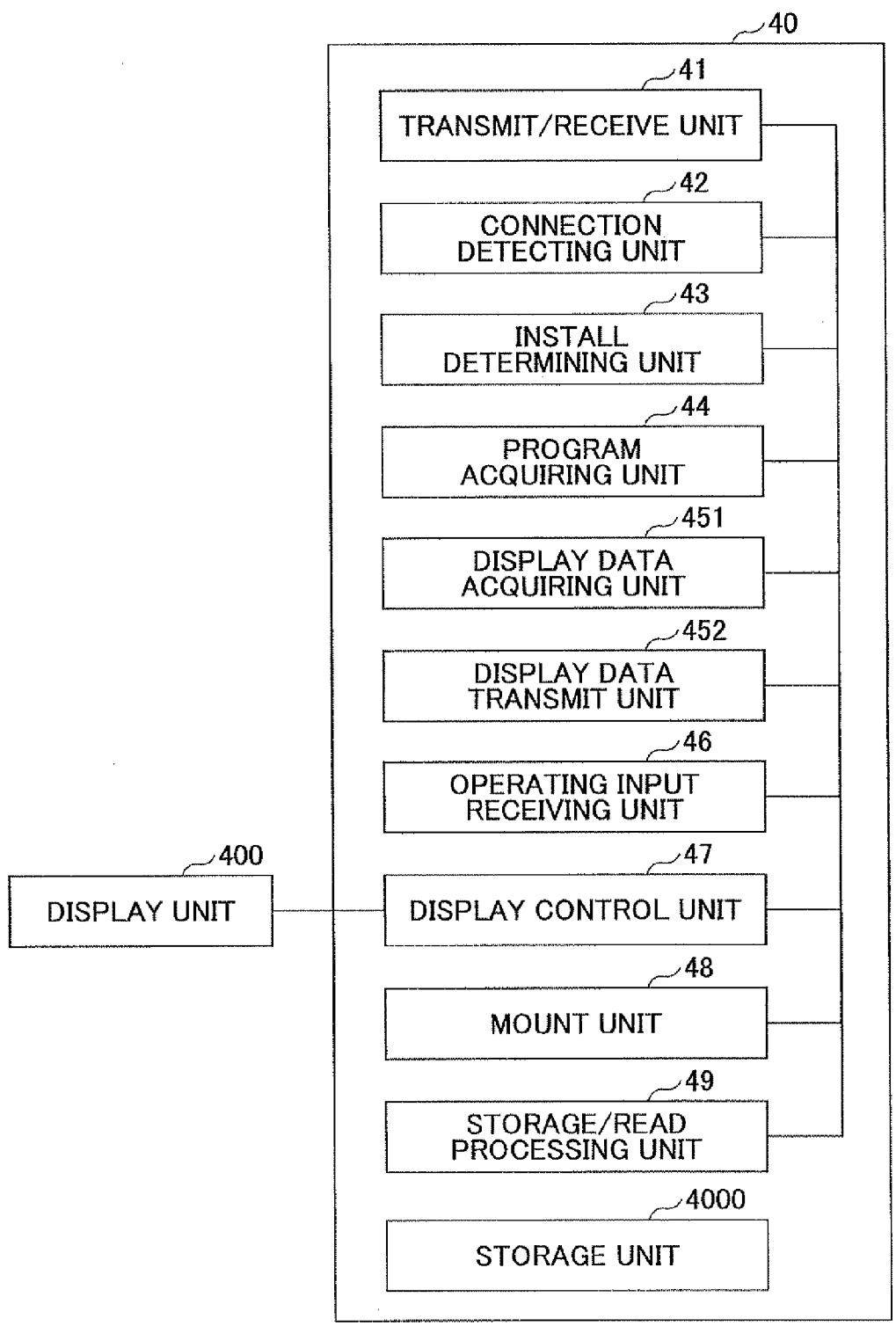
FIG. 25 is a functional block diagram of the external input apparatus.
Figure 26:
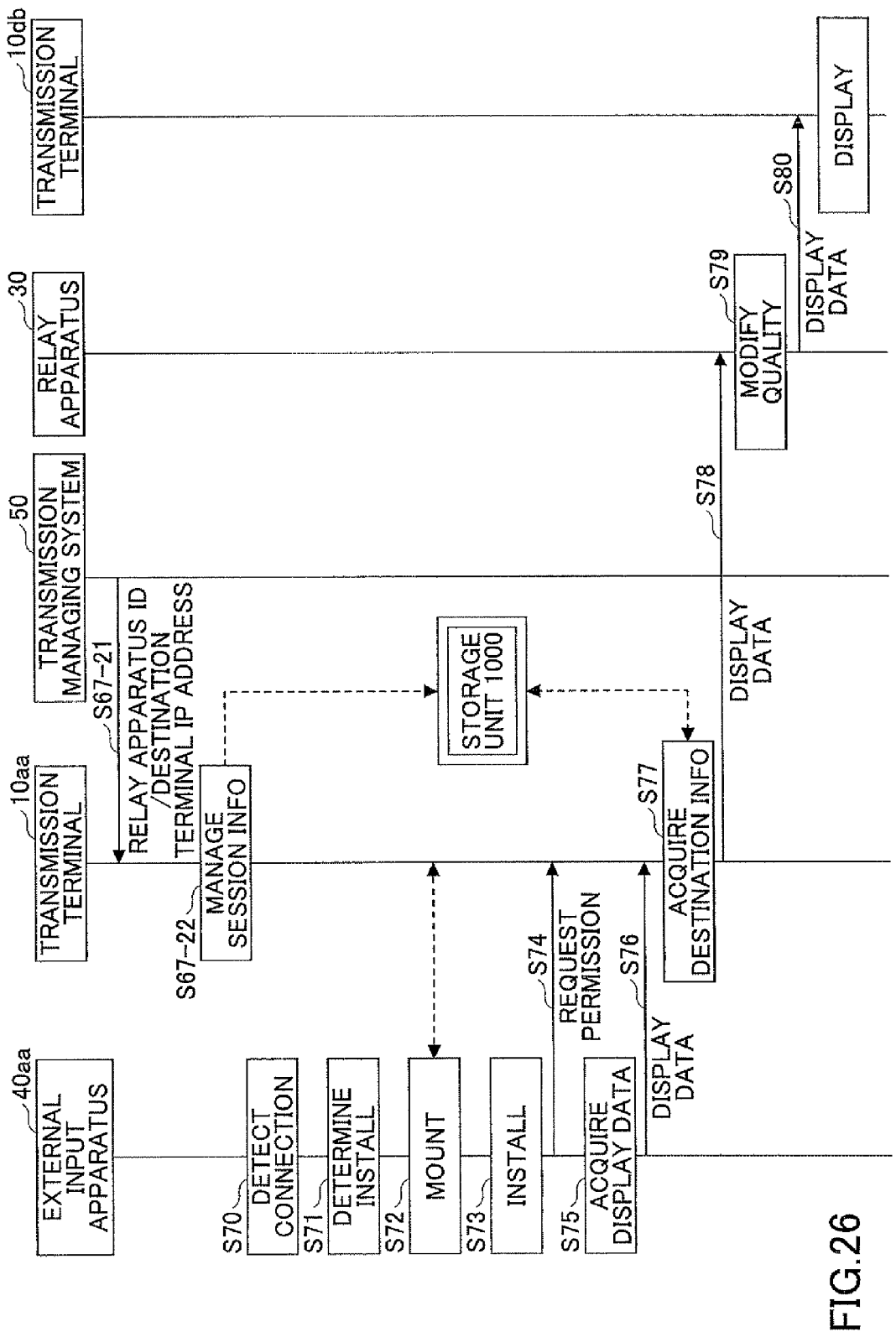
FIG. 26 is a sequence chart of a process of causing the transmission terminal on the other end of a video conference to display data displayed on the external input apparatus on one end.
Figure 27:
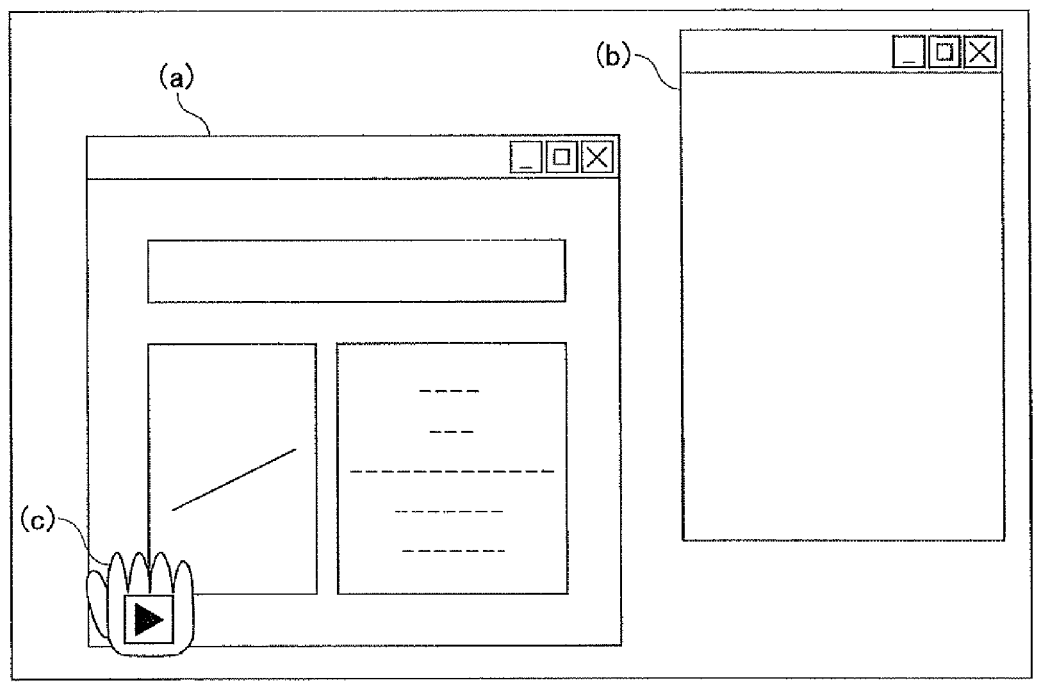
FIG. 27 illustrates an example of a screen displayed by the external input apparatus on the one end of the video conference.
Figure 28:
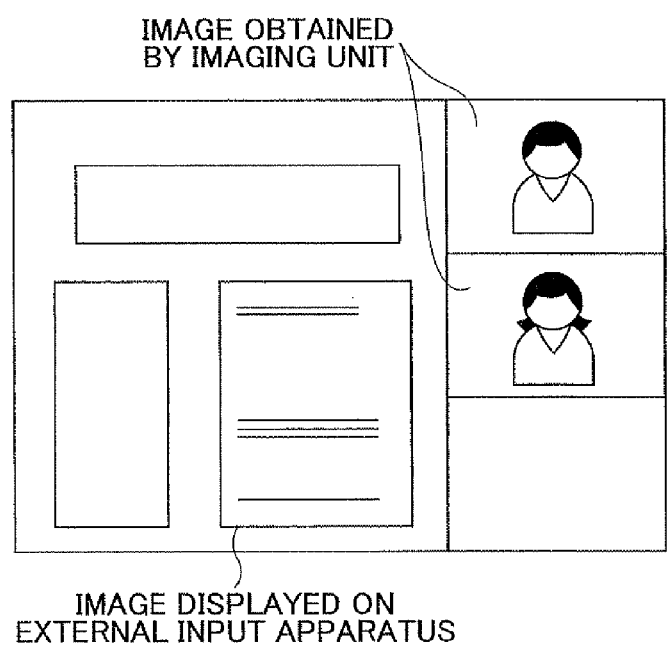
FIG. 28 is an example of a screen of the transmission terminal on the other end of the video conference.

With reference to FIGS. 16 through 23 and FIGS. 26 through 29, a processing method performed in the transmission system 1 according to the present embodiment is described. FIG. 16 is a sequence chart of a process of managing the status information transmitted from the relay apparatus 30 to the transmission managing system 1. FIG. 17 is a sequence chart of a process in a preparatory stage prior to the start of communications among plural transmission terminals 10. FIG. 18 is a sequence chart of a process of narrowing the relay apparatuses 30. FIG. 19 is a flowchart of the process of narrowing the relay apparatuses 30. FIG. 20 is a table illustrating how the points are calculated during the process of narrowing the relay apparatuses 30. FIG. 21 is a sequence chart of a process in which the transmission terminal 10 selects the relay apparatus 30. FIG. 22 is a flowchart of the process in which the transmission terminal 10 selects the relay apparatus 30. FIG. 23 is a sequence chart of a process in which video data and audio data are transmitted and received between the transmission terminals 10. FIG. 26 is a sequence chart of a process of causing the transmission terminal 10 on the opposite end of a conference to display the display data displayed on the external input apparatus 40 on one end of the conference. FIG. 27 illustrates an example of a screen displayed by the external input apparatus 40. FIG. 28 illustrates an example of a screen for displaying video data and display data on the transmission terminal 10 on the opposite end. FIG. 29 is a flowchart of a process of installing the display data acquiring unit in the external input apparatus.

Referring to FIG. 16, a process of managing the status information of the relay apparatus 30 transmitted from the relay apparatus 30 to the transmission managing system 50 is described. In the relay apparatus 30, the status detecting unit 32 illustrated in FIG. 5 detects the operating status of the relay apparatus 30 at regular intervals (S1-1 through S1-4). In order to enable the transmission managing system 50 to manage the operating status of the relay apparatus 30 in real time, the transmitting/receiving unit 31 of the relay apparatus 30 transmits the status information to the transmission managing system 50 at regular intervals via the communication network 2 (steps S2-1 through S2-4). The status information may include the relay apparatus ID of the relay apparatus 30 and the operating status of the corresponding relay apparatus 30. In accordance with the present embodiment, it is assumed that the relay apparatuses 30a, 30b, and 30d are operating normally and in the "online" status but the relay apparatus 30c, while operating, is in the "offline" status due to a problem in the program for performing the relaying operation of the relay apparatus 30c.

In the transmission managing system 50, the status information transmitted from the relay apparatus 30 is received by the transmitting/receiving unit 51. The transmission managing system 50 stores and manages the status information in the relay apparatus managing table of the storage unit 5000 (see FIG. 8) in association with the relay apparatus ID, via the storage/read processing unit 59 (steps S3-1 through S3-4). Thus, the operating status of "online", "offline", or "failure" is stored and managed in the relay apparatus managing table of FIG. 8, in association with the relay apparatus ID. At this time, the receive date/time of reception of the status information by the transmission managing system 50 is also stored and managed in association with the relay apparatus ID. In the absence of transmission of the status information from the relay apparatus 30, the fields of the corresponding record of the relay apparatus managing table of FIG. 8 for the operating status and the receive date/time may be left blank. Alternatively, the operating status and the receive date/time for the previous reception may be indicated in the fields.

Referring to FIG. 17, a process in the preparatory stage prior to the start of communications between the transmission terminal 10aa and the transmission terminal 10db is described. First, a user turns on the power switch 109 of FIG. 3, and then the operating input receiving unit 12 of FIG. 5 turns on the transmission terminal 10aa (step S21) in response to a power-on signal. In response, the login request unit 13 automatically transmits login request information indicating a login request to the transmission managing system 50 from the transmitting/receiving unit 11 via the communication network 2 (step S22). The login request information may include the terminal ID identifying the transmission terminal 10aa as a requesting source and a password. The terminal ID and the password may be read from the storage unit 1000 via the storage/read processing unit 19 and delivered to the transmitting/receiving unit 11. By transmitting the login request information from the transmission terminal 10aa to the transmission managing system 50, the transmission managing system 50 on the receiving end can learn the IP address of the transmission terminal 10ab on the transmitting end.

Then, the terminal authentication unit 52 of the transmission managing system 50 searches the terminal authentication managing table (FIG. 9) in the storage unit 5000 by using the terminal ID and the password included in the login request information received via the transmitting/receiving unit 51 as search keys, and determines whether the corresponding terminal ID and password are managed in the terminal authentication managing DB 5002, thus performing terminal authentication (step S23). When the corresponding terminal ID and password are managed in the terminal authentication unit 52, it is determined that the login request is from the transmission terminal 10 having valid access rights. In this case, the status managing unit 53 stores the terminal ID and the operating status of the transmission terminal 10aa, the receive date/time of reception of the login request information, and the IP address of the transmission terminal 10aa in association with one another in the terminal managing table (FIG. 10) (step S24). For example, the terminal managing table of FIG. 10 stores the operating status "online", the receive date/time "2009.11.10.13:40", and the terminal IP address "1.2.1.3" in association with the transmission terminal ID "01aa".

The transmitting/receiving unit 51 of the transmission managing system 50 then transmits, via the communication network 2, authentication result information indicating the result of authentication by the terminal authentication unit 52 to the request source terminal 10aa that has made the login request (step S25). In accordance with the present embodiment, when it is determined by the terminal authentication unit 52 that the transmission terminal 10 has the valid access right, the following process is performed.

The terminal extracting unit 54 of the transmission managing system 50 searches the destination list managing table (FIG. 11) by using the terminal ID "01aa" of the request source terminal 10aa that has made the login request as a search key, and reads (i.e., extracts) the terminal IDs of candidates for the destination terminal 10B that can communicate with the request source terminal 10aa (step S26). In the illustrated example, the terminal IDs "01ab", "01ba", and "01db" of the destination terminals 10ab, 10ba, and 10db, respectively, associated with the terminal ID "01aa" of the request source terminal 10aa are extracted.

Then, the terminal status acquiring unit 55 searches the terminal managing table (FIG. 10) by using the terminal IDs "01ab", "01ba", and "01db" of the candidates for the destination terminal 10B extracted by the terminal extracting unit 54 as search keys, and reads the operating status "offline", "online", or "online" associated with the corresponding terminal ID, thus acquiring the operating status of each of the transmission terminals 10ab, 10ba, and 10db (step S27).

The transmitting/receiving unit 51 then transmits the destination status information including the terminal IDs "01ab", "01ba", and "01db" as the search keys used in step S27, and the operating status "offline", "online", or "online" of the corresponding destination terminals 10ab, 10ba, and 10db to the request source terminal 10aa via the communication network 2 (step S28). Thus, the request source terminal 10*aa* can recognize the current operating status of the transmission terminals 10*ab*, 10*ba*, and 10*db* as candidates for the destination terminal 10B that can communicate with the request source terminal 10*aa*.

Further, the terminal extracting unit 54 of the transmission managing system 50 searches the destination list managing table (FIG. 11) by using the terminal ID "01*aa*" of the request source terminal 10*aa* as a search key, and extracts the terminal IDs of other request source terminals 10A that have registered the terminal ID "01*aa*" of the request source terminal 10*aa* as a candidate for the destination terminal 10B (step S29). For example, in the destination list managing table of FIG. 11, the terminal IDs of the other request source terminals 10A that are extracted are "01*ab*", "01*ba*", and "01*db*".

The terminal status acquiring unit 55 of the transmission managing system 50 then searches the terminal managing table (FIG. 10) by using the terminal ID "01*aa*" of the request source terminal 10*aa* that has made the login request as a search key, and acquires the operating status of the request source terminal 10*aa* (step S30).

Then, the transmitting/receiving unit 51 transmits destination status information to the transmission terminals 10*ba* and 10*db* whose operating status is "online" in the terminal managing table (FIG. 10) among the transmission terminals 10*ab*, 10*ba*, and 10*db* associated with the terminal IDs "01*ab*", "01*ba*", and "01*db*" extracted in step S29. The destination status information includes the terminal ID "01*aa*" of the request source terminal 10*aa* acquired in step S30 and the operating status "online" (steps S31-1 and S31-2). When transmitting the destination status information to the transmission terminals 10*ba* and 10*db*, the transmitting/receiving unit 51 refers to the IP addresses of the terminals managed in the terminal managing table of FIG. 10 based on the terminal IDs "01*ba*" and "01*db*". Thus, the terminal ID "01*aa*" of the request source terminal 10*aa* that has made the login request and the operating status "online" can be transmitted to each of the other destination terminals 10*db* and 10*ba* that can communicate with the request source terminal 10*aa* as a destination.

In another transmission terminal 10, when a user turns on the power switch 109 of FIG. 4 as in step S21, the operating input receiving unit 12 of FIG. 5 may initiate processes similar to those of steps S22 through S31-1/31-2.

Referring to FIG. 18, a process of narrowing the relay apparatuses 30 is described. In accordance with the present embodiment, the request source terminal 10*aa* can communicate with at least one of the transmission terminals 10*ba* and 10*db* among the candidates of which the operating status is "online" based on the destination status information received in step S28. Thus, the following description is made on the assumption that the user of the request source terminal 10*aa* has selected to communicate with the destination terminal 10*db*.

When the user presses the operating button 108 of FIG. 3 to select the transmission terminal 10*db*, the operating input receiving unit 12 of FIG. 5 receives a request for starting communications with the transmission terminal 10*db* (step S41). The transmitting/receiving unit 11 of the transmission terminal 10*aa* then transmits start requesting information including the terminal ID "01*aa*" of the request source terminal 10*aa* and the terminal ID "01*db*" of the destination terminal 10*db* to the transmission managing system 50 (step S42). Thus, the transmitting/receiving unit 51 of the transmission managing system 50 receives the start requesting information and also learns the IP address "1.2.1.3" of the request source terminal 10*aa* (transmitting source).

Then, the status managing unit 53 modifies the terminal managing table (FIG. 10) based on the terminal ID "01*aa*" of the request source terminal 10*aa* and the terminal ID "01*db*" of the destination terminal 10*db* that are included in the start requesting information (step S43). Specifically, the status managing unit 53 modifies the fields for the operating status of the records corresponding to the terminal IDs "01*aa*" and "01*db*" in the terminal managing table (FIG. 10) to "connected". In this status, the request source terminal 10*aa* and the destination terminal 10*db* may not have actually started communicating with each other but are connected or "busy". Thus, when another transmission terminal 10 attempts to communicate with the request source terminal 10*aa* or the destination terminal 10*db*, an audio or visual output indicating the connected ("busy") status may be made.

Next, the process of performing a session for selecting the relay apparatus 30 in steps S44 through S48 and steps S61-1 through 66 is described. First, the selection session ID generating unit 56*a* generates a selection session ID used for performing the session for selecting the relay apparatus 30 (step S44). The session managing unit 57 then stores and manages the selection session ID "se1" generated in step S44, the terminal ID "01*aa*" of the request source terminal 10*aa*, and the terminal ID "01*db*" of the destination terminal 10*db* in the session managing table (FIG. 12) in the storage unit 5000 (step S45) in association with one another.

Then, the narrowing unit 56 of the transmission managing system 50 performs, based on the relay apparatus managing DB 5001, the terminal managing DB 5003, and the priority managing DB 5006, the primary narrowing process for narrowing the relay apparatuses 30 for relaying the communication between the request source terminal 10*aa* and the destination terminal 10*db*.

Referring to FIG. 19, the process of step S46 is described in detail. First, the terminal IP address extracting unit 56*b*, based on the terminal ID "01*aa*" of the request source terminal 10*aa* and the terminal ID "01*db*" of the destination terminal 10*db* that are included in the communication request information transmitted from the request source terminal 10*aa*, searches the terminal managing table (FIG. 10), and extracts the IP addresses "1.2.1.3" and "1.3.2.4" of the corresponding transmission terminals 10*aa* and 10*db* (step S46-1). Then, the primary selecting unit 56*c* selects the relay apparatus IDs 111*a*, 111*b*, and 111*d* of the relay apparatuses 30*a*, 30*b*, and 30*d* with the operating status "online" among the relay apparatuses 30 managed in the relay apparatus managing table (FIG. 8)(step S46-2). Also, the primary selecting unit 56*c*, based on the IP address "1.2.1.3" of the request source terminal 10*aa* and the IP address "1.3.2.4" of the destination terminal 10*db* extracted in step S46-1, searches the relay apparatus managing table (FIG. 8). The search involves determining whether the individual dot addresses of the IP addresses "1.2.1.2.", "1.2.2.2", and "1.3.2.2" of the relay apparatuses 30*a* and 30*b*, and 30*d* selected in step S46-2 correspond to, i.e., whether they are the same as or different from, the individual dot addresses of the IP addresses "1.2.1.3" and "1.3.2.4" of the request source terminal 10*aa* and the destination terminal 10*db* (step S46-3).

The priority determining unit 57*c* then determines the address priority point for each of the relay apparatuses 30*a*, 30*b*, and 30*d* investigated in step 46-3, by referring to the priority managing table (FIG. 13)(step S46-4). FIG. 20 illustrates an example of the result of calculating the priority points during the process of narrowing the relay apparatuses 30. Specifically, FIG. 20 illustrates the address priority points, the transmission rate priority point, and the integrated points for each relay apparatus ID. The address priority points include points of the relay apparatus 30 with respect to the request source terminal 10aa and points with respect to the destination terminal 10db of. The integrated points equal a sum of the higher of the two address priority points and the transmission rate priority points.

In accordance with the present embodiment, the IP address "1.2.1.2" of the relay apparatus 30a (ID 111a; see FIGS. 1 and 8) is "same, same, same, different" with respect to the IP address "1.2.1.3" of the request source terminal 10aa (FIG. 10). Thus, as illustrated in FIG. 20, the address priority points of the relay apparatus 30a with respect to the source terminal 10aa equal "5" according to the table of FIG. 13. The IP address "1.2.1.2" of the relay apparatus 30a is "same, different, different, different" with respect to the IP address "1.3.2.4" of the destination terminal 10db. Thus, the address priority points with respect to the destination terminal 10db equal "1". The IP address "1.2.2.2" of the relay apparatus 30b (ID 111b) is "same, same, different, different" with respect to the IP address "1.2.1.3" of the request source terminal 10aa. Thus, the address priority points of the relay apparatus 30b with respect to the source terminal 10aa equal "3" according to FIG. 13. The IP address "1.2.2.2" of the relay apparatus 30b is "same, different, same, different" with respect to the IP address "1.3.2.4" of the destination terminal 10db. Thus, the address priority points of the relay apparatus 30b with respect to the destination terminal 10db equal "1". The IP address "1.3.2.2" of the relay apparatus 30d (ID 111d) is "same, different, different, different" with respect to the IP address "1.2.1.3" of the request source terminal 10aa, so that the address priority points of the relay apparatus 30d with respect to the source terminal 10aa equal "1". Further, the IP address "1.3.2.2" of the relay apparatus 30d is "same, same, same, different" with respect to the IP address "1.3.2.4" of the destination terminal 10db, so that the address priority points with respect to the destination terminal 10db equal "5".

Referring back to FIG. 19, the priority determining unit 57d, based on the maximum data transmission rate of each of the relay apparatuses 30 managed in the relay apparatus managing table (FIG. 8), searches the priority managing table (FIG. 14), and determines the transmission rate priority points for each of the relay apparatuses 30a, 30b, and 30d that have been narrowed down by the primary narrowing process in step S46-2 (step S46-5). In accordance with the present embodiment, as illustrated in FIG. 8, the maximum data transmission rate of the relay apparatus 30a is 100 Mbps. Thus, the transmission rate priority is 3 points according to the transmission rate priority of FIG. 14. Similarly, because the maximum data transmission rate of the relay apparatus 30b is 1000 Mbps, the transmission rate priority is 5 points. The maximum data transmission rate of the relay apparatus 30d is 10 Mbps, so that the transmission rate priority is 1 point.

Then, the primary selecting unit 56c selects two of the relay apparatuses 30a, 30b, and 30d with the higher integrated points (step 46-6). In accordance with the present embodiment, as illustrated in FIG. 20, the relay apparatus IDs 111a, 111b, and 111d are allocated the integrated points "8", "8", and "6", respectively. Thus, the relay apparatus 30a associated with the relay apparatus ID "111a" and the relay apparatus 30b associated with the relay apparatus ID "111b" are selected.

Referring to FIG. 18, when the narrowing process of step S46 (FIG. 19) is completed, the transmitting/receiving unit 51 of FIG. 5 transmits relay apparatus narrowing information to the destination terminal 10db via the communication network 2 in order to convey the number of the narrowed relay apparatuses 30 (step S47). The relay apparatus narrowing information may include the number of the relay apparatuses 30 narrowed down in step S46, i.e., "2"; the terminal ID "01aa" of the request source terminal 10aa; and the selection session ID "se1". Thus, the transmission terminal 10db can be informed of the number of the relay apparatuses 30 and identify the transmission terminal 10 from which the request for a video conference has been received when performing the session corresponding to the selection session ID "se1". Thus, the transmission terminal 10db can learn the IP address "1.1.1.2" of the transmission managing system 50, i.e., the transmitting source of the relay apparatus narrowing information.

The transmission terminal 10db then transmits reception completion information from the transmitting/receiving unit 11 via the communication network 2 to the transmission managing system 50, indicating the completion of reception of the relay apparatus narrowing information (step S48). The reception completion information may include the session ID "se1". Thus, the transmission managing system 50 can learn the IP address "1.3.2.4" of the transmission terminal 10db, i.e., the transmitting source, as well as the completion of transmission of the number of the relay apparatuses implemented in the session with the session ID "se1" as illustrated in FIG. 18.

Referring to FIG. 21, a process of the destination terminal 10da selecting the relay apparatus 30 is described. First, the transmission managing system 50, prior to starting a video conference, transmits pre-relay request information to each of the relay apparatuses 30a and 30b narrowed in step S46 (steps S61-1 and 61-2). The pre-relay request information may include the session ID "se1", the IP address "01aa" of the request source terminal 10aa, and the destination terminal 10db. Thus, the relay apparatuses 30a and 30b can identify the selection session, the request source terminal 10A, and the destination terminal 10B. The relay apparatuses 30a and 30b can also learn the IP address "1.1.1.2" of the transmission managing system 50 as the transmitting source of the pre-relay request information.

Then, each of the relay apparatuses 30a and 30b transmits pre-transmit request information from the transmitting/receiving unit 31 via the communication network 2 to the request source terminal 10aa recognized in steps S61-1 and 61-2, requesting the transmission of the pre-transmit information to the relay apparatuses 30a and 30b prior to the start of the video conference, the pre-transmit information including a ping (Packet Internet Groper), as will be described later (steps S62-1 and 62-2). The pre-transmit information may include the session ID "se1". Thus, the request source terminal 10aa, in the process of selecting the relay apparatus 30 implemented with the session ID "se1", can be informed of the need to transmit the pre-transmit information to the relay apparatuses 30a and 30b, and also learn their IP addresses "1.2.1.2" and "1.2.2.2" as the transmitting sources of the pre-transmit request information.

Thus, instead of directly sending the IP address of the destination terminal 10db from the transmission managing system 50 to the request source terminal 10aa, first the relay apparatus 3a is informed of the IP address of the destination terminal 10db in step S61-1, and then the relay apparatus 30a requests the request source terminal 10aa to transmit the pre-transmit request information to the same relay apparatus 30a in step 61-2. This is to ensure security by not letting one transmission terminal 10 know the IP address of the other transmission terminal 10.

Then, the request source terminal 10aa transmits pre-transmit information from the transmitting/receiving unit 11 via the communication network 2 to the relay apparatuses 30a and 30b (steps S63-1 and 63-2). The pre-transmit information is transmitted to the destination terminal 10db via the relay apparatuses 30a and 30b, instead of and prior to the transmission of video data and audio data in order to measure the required time between transmission by the request source terminal 10aa and reception by the destination terminal 10db. The pre-transmit information may include a ping for confirming that the request source terminal 10aa, the relay apparatuses 30a and 30b, and the destination terminal 10db are communicatively connected to one another; the transmit date/time of transmission of the pre-transmit information from the request source terminal 10aa; and the session ID "se1". Thus, the relay apparatuses 30a and 30b can recognize the transmission of the pre-transmit information and the IP address "1.2.1.3" of the request source terminal 10aa, i.e., the transmitting source of the pre-transmit information, when the session with the selection session ID "se1" is performed.

Then, each of the relay apparatuses 30a and 30b relays the pre-transmit information to the IP address "1.3.2.4" of the destination terminal 10db included in the pre-relay request information received in steps S61-1 and 61-2 (steps S64-1 and 64-2). Thus, the destination terminal 10db can recognize the arrival of the pre-transmit information and also learn the IP addresses "1.2.1.2" and "1.2.2.2" of the relay apparatuses 30a and 30b, i.e., the transmitting sources (relaying sources) of the pre-transmit information when the session with the session ID "se1" is performed.

Then, the selection processing unit 16 of the destination terminal 10db, based on the pre-transmit information, narrows down the relay apparatuses to one relay apparatus 30 for relaying video data and audio data during the video conference (step 65).

Referring to FIGS. 5 and 22, the process of step S65 is described in detail. First, the measuring unit 16a of the selection processing unit 16 of FIG. 5 measures the receive date/time of reception, by the transmitting/receiving unit 11 of the transmission terminal 10db, of the pre-transmit information relayed by the relay apparatuses 30a and 30b and (step S65-1). Then, the calculating unit 16b calculates a required time between transmission and reception of the pre-transmit information based on the difference between the receive date/time and the transmit date/time included in the pre-transmit information, for each item of the pre-transmit information whose receive time is measured (step S65-2).

The selecting unit 16c then determines whether, during the session with the session ID "se1", all of a number of items of the pre-transmit information corresponding to the number of the relay apparatuses 30 expected to relay, i.e., "2", have been received (step S65-3). When not all of the items of the pre-transmission information have been received ("NO" in S65-3), the selecting unit 16c determines whether a predetermined time (such as 1 minute) has elapsed since the reception of the pre-transmit information by the transmission terminal 10db (step S65-4). When the predetermined time has not elapsed ("NO" in S65-4), the routine returns to step S65-1.

On the other hand, when it is determined that all of the items have been received ("YES" in step 65-3), or that the predetermined time has elapsed ("YES" in step S65-4), the selecting unit 16c selects one of the relay apparatuses 30 that has relayed the pre-transmit information with the minimum of the required times calculated by the calculating unit 16b (step S65-5). In accordance with the present embodiment, the relay apparatus 30a may be selected when the required time between transmission and reception of the pre-transmit information is shorter when relayed by the relay apparatus 30a than by the relay apparatus 30b.

In accordance with the present embodiment, the relay apparatuses 30 are narrowed down to the relay apparatus 30a on the side of the destination terminal 10db. However, this is merely an example. Preferably, the destination terminal 10db may transmit all items of the required time information indicating the required time between transmission and reception of the pre-transmit information to the request source terminal 10aa or the transmission managing system 50, and then the relay apparatuses may be narrowed down to the one relay apparatus 30a on the side of the request source terminal 10aa or the transmission managing system 50.

The destination terminal 10db then transmits selection information from the transmitting/receiving unit 11 via the communication network 2 to the transmission managing system 50, the selection information indicating the selection of the relay apparatus 30a (step S66). The selection information may include the session ID "se1" and the relay apparatus ID "111a" of the selected relay apparatus 30a. Thus, the transmission managing system 50, when performing the session with the session ID "se1", can recognize that the relay apparatus 30a has been selected and that the IP address of the selection information transmitting source, i.e., the transmission terminal 10db, is "1.3.2.4".

The session managing unit 57 of the transmission managing system 50 then stores, in the session managing table of the session managing DB 5005 (FIG. 12), the relay apparatus ID "111a" of the finally selected relay apparatus 30a in the field for the relay apparatus ID of the record including the selection session ID "se1" (step S67-1). The transmitting/receiving unit 51 then transmits the relay apparatus ID "111a" and the IP address "1.3.2.4" of the destination terminal 10db to the request source terminal 10aa (step S67-21). Thereafter, the transmitting/receiving unit 51 of the transmission managing system 50 transmits relay start requesting information to the relay apparatus 30a via the communication network 2, requesting the start of relaying (step S68). The relay start requesting information may include the IP addresses "1.2.1.3" and "1.3.2.4" of the request source terminal 10aa and the destination terminal 10db, respectively. Thus, the relay apparatus 30a, between the transmission terminals 10aa and 10db, establishes a session for communicating the video data including the three resolutions, i.e., low, intermediate, and high resolutions, and audio data (step S69). Thus, the transmission terminals 10aa and 10db can start a video conference.

In the foregoing embodiment, in step S47, the transmission managing system 50 transmits the relay apparatus narrowing information to the destination terminal 10db and then the relay apparatus selecting process (step S65) is performed on the side of the destination terminal 10db via steps S48 through S64-1, 64-2. However, this is merely an example. Preferably, the transmission managing system 50 may transmit the relay apparatus narrowing information to the request source terminal 10aa in step S47 with the transmitting source and the receiving source exchanged between the request source terminal 10aa and the destination terminal 10db, until steps S64-1 and 64-2 inclusive. In this way, the request source terminal 10aa may perform the relay apparatus selecting process in a step corresponding to step S65 and transmit the selection information in a step corresponding to step S66.

Referring to FIGS. 5 and 23, a process of transmitting and receiving the video data and audio data between the request source terminal 10aa and the destination terminal 10db for a video conference is described. First, the request source terminal 10aa transmits the video data of the object imaged by the imaging unit 14a and the audio data of the audio inputted by the audio input unit 15a to the relay apparatus 30a from the transmitting/receiving unit 11 via the communication network 2 (step S81). In accordance with the present embodiment, the data transmitted may include high-quality video data consisting of the low-resolution, intermediate-resolution, and high-resolution images illustrated in FIG. 6 and the audio data. Thus, in the relay apparatus 30a, the transmitting/receiving unit 31 receives the video data having the three resolutions and the audio data.

Still referring to FIG. 23, the data quality confirming unit 33 then searches the modified quality managing table (FIG. 7) by using the IP address "1.3.2.4" of the destination terminal 10db as a search key, and extracts the image quality of the corresponding video data to be relayed, thus confirming the quality of the video data to be relayed (step S82). In accordance with the present embodiment, the confirmed image quality of the video data is "high-quality", which corresponds to the image quality of the video data received by the transmitting/receiving unit 31. Thus, the video data and the audio data are transferred to the destination terminal 10db without modifying their quality (step S83). After the destination terminal 10db receives the video data and audio data via the transmitting/receiving unit 11, an image based on the received video data is displayed on the display 120 by the image display control unit 14b, and an audio output is provided by the audio output unit 15b based on the received audio data.

Then, the delay detecting unit 17 of the transmission terminal 10db detects a reception delay time of the video data received by the transmitting/receiving unit 11 at predetermined time intervals (such as 1 second intervals)(step S84). In accordance with the present embodiment, the delay time may be 200 ms. The transmitting/receiving unit 11 of the destination terminal 10db transmits delay information indicating the delay time "200 ms" to the transmission managing system 50 via the communication network 2 (step S85). Thus, the transmission managing system 50 can recognize the delay time and also recognize the IP address "1.3.2.4" of the delay information transmitting source, i.e., the transmission terminal 10db.

Still referring to FIG. 23, the delay time managing unit 60 of the transmission managing system 50 then searches the terminal managing table (FIG. 10) by using the IP address "1.3.2.4" of the destination terminal 10db as a search key, and extracts the corresponding terminal ID "01db". Further, the delay time managing unit 60 stores the delay time "200 ms" indicated in the delay information in the session managing table (FIG. 12) of the session managing DB 5005, specifically in the field for the delay time in the record corresponding to the terminal ID "01db" (step S86). The quality determining unit 58 then searches the quality managing table (FIG. 15) by using the delay time "200 ms" as a search key, and extracts the image quality "intermediate image quality" of the corresponding video data, thus determining the image quality to be "intermediate image quality" (step S87).

Then, the transmitting/receiving unit 51 searches the relay apparatus managing DB table (FIG. 8) by using the relay apparatus ID "111a" associated with the terminal ID "01db" in the session managing table (FIG. 12) as a search key, and extracts the IP address "1.2.1.2" of the corresponding relay apparatus 30a (step S88). The transmitting/receiving unit 51 then transmits the quality information indicating "intermediate image quality" of the video data determined in step S87 to the relay apparatus 30a via the communication network 2 (step S89). The quality information may include the IP address "1.3.2.4" of the destination terminal 10db that has been used as a search key in step S86. Thus, in the relay apparatus 30a, the modified quality managing unit 34 stores, in the modified quality managing table (FIG. 7), the IP address "1.3.2.4" of the transmission terminal 10 as a destination (i.e., the destination terminal 10db in the illustrated example) and the image quality "intermediate image quality" of the relayed video data in association with each other (step S90).

Then, the transmission terminal 10ba, as in step S81, transmits the high-quality video data consisting of the low-, intermediate-, and high-quality data (step S91) and audio data to the relay apparatus 30a. Thus, in the relay apparatus 30a, as in step S82, the data quality confirming unit 33 searches the modified quality managing table (FIG. 7) by using the IP address "1.3.2.4" of the destination terminal 10db as a search key, and extracts the image quality "intermediate image quality" of the corresponding video data to be relayed, thus confirming the image quality of the relayed video data (step S92). In accordance with the present embodiment, the confirmed image quality may be "intermediate image quality", which is lower than the image quality "high-quality" of the video data received by the transmitting/receiving unit 31. Thus, the data quality modifying unit 35 changes the video data quality from "high-quality" to "intermediate image quality", thus modifying the image quality of the video data (step S93).

The transmitting/receiving unit 31 then transmits the video data with the modified image quality "intermediate image quality" and the audio data whose audio quality is not modified to the transmission terminal 10db via the communication network 2 (step S94). Thus, when there is a reception delay in the destination terminal 10db upon reception of the video data, the relay apparatus 30a modifies the image quality so that the participants of the video conference are not annoyed.

Next, a description is given of a process of sharing an entire screen displaying the material data stored in the storage unit 4000 of the external input apparatus 40 after the relay apparatus 30 is determined, with reference to FIG. 26. Specifically, an example is described in which information (material data) being displayed on the external input apparatus 40aa connected to the transmission terminal 10aa is displayed on the transmission terminal 10db as a destination terminal.

As described above, after the relay apparatus 30 is determined, the relay apparatus ID "111a" and the IP address "1.3.2.4" of the destination terminal 10db transmitted by the transmission managing system 50 in S67-21 are received by the transmitting/receiving unit 11 of the transmission terminal 10aa, and the received relay apparatus ID "111a" and IP address "1.3.2.4" are stored by the storage/read processing unit 19 in the storage unit 1000 (step S67-22).

Referring to FIG. 26, when the external input apparatus 40aa and the transmission terminal 10aa are connected to each other, the connection detecting unit 42 of the external input apparatus 40aa detects the connection (step S70). Then, the install determination unit 43, as illustrated in FIG. 29, determines whether the display data transmitting unit 452 is already installed (step S71). When it is determined in step S71 that the display data transmitting unit 452 is not yet installed, the program acquiring unit 44 acquires the data transmitting unit 452 stored in the transmission terminal 10aa and installs it (step S72). Then, the external input apparatus 40aa sends a request to the transmission terminal 10aa for permission for the display data acquiring unit 451 to perform a process (step S73). When the transmission terminal 10aa grants permission to the external input apparatus 40aa for performing the process by the display data acquiring unit 451, the display data acquiring unit 451 acquires the display data (step S74). Then, the display data transmitting unit 452 transmits the display data acquired by the display data acquiring unit 451 to the transmission terminal 10aa (step S75). When it is determined in step S71 that the display data transmitting unit 452 is installed, step S72 is omitted.

Upon reception of the display data by the external information transmitting/receiving unit 18 of the transmission terminal 10aa, the storage/read processing unit 19 acquires the relay apparatus ID "111a" stored in the storage unit 1000 and the IP address "1.3.2.4" of the destination, i.e., the transmission terminal 10db (step S77). Then, the transmitting/receiving unit 11 transmits the display data and the IP address "1.3.2.4" of the destination transmission terminal 10db, to the relay apparatus 30 indicated by the relay apparatus ID "111a" acquired in step S77 (step S78). Upon reception of the display data from the transmission terminal 10aa in step S78, the relay apparatus 30, based on the IP address "1.3.2.4" of the transmission terminal 10db, modifies the quality of the display data (step S79), and transmits the display data to the transmission terminal 10db (step S80). The details of the process of step S77 may be similar to those of the process of modifying the quality of audio data and video data as described above (steps S81 through S94).

Still referring to FIG. 26, upon reception of the display data from the relay apparatus 30 by the transmitting/receiving unit 11 of the transmission terminal 10db, the image display control unit 14b causes the display data to be displayed. In the example illustrated in FIG. 28, the image displayed by the external input apparatus 40aa is displayed in the left side of the screen based on the display data, while the video data of the image imaged by the imaging unit 14a of the transmission terminal 10aa and transmitted by the transmitting/receiving unit 11 is displayed in an upper-right portion of the screen. In a lower-right portion of the screen, there is displayed the video data imaged by the imaging unit 14a of the transmission terminal 10db.

Main Effects

Thus, in accordance with the present embodiment, the relay apparatus ID of the relay apparatus 30 that relays the audio data and video data is stored in the storage unit 1000 of the transmission terminal 10aa. As a result, the display data of material data stored in the storage unit 4000 of the external input apparatus 40 that is not managed by the transmission managing system 50 can be transmitted to the transmission terminal 10db of a counterpart of a conference. Because the transmission managing system 50 does not need to perform a process of authenticating the external input apparatus 40, its managing workload can be reduced.

When it is desired to share a screen being displayed on an external input apparatus 40 that does not have the display data acquiring unit 451 or the display data transmitting unit 452, the external input apparatus 10 can be provided with the display data acquiring unit 451 or the display data transmitting unit 452 upon connection with the transmission terminal 10, thus enabling the sharing of the screen.

In the communication network 2, it may be possible to obtain the environment of the LANs 2a through 2d, such as the IP address of the relay apparatus 30. However, it may be difficult to obtain the environment of the Internet 2i. Thus, initially, the relay apparatuses 30 for relaying video data and audio data are narrowed down to two or more relay apparatuses based on the information of the available environment. Then, prior to actually transmitting or receiving video data and audio data between the plural transmission terminals 10, the pre-transmit information is transmitted and received instead of the video data and audio data. In this way, the relay apparatuses 30 can be narrowed down to one relay apparatus capable of actually relaying the pre-transmit information within the shortest time.

Namely, two or more of the relay apparatuses 30 that are allocated with upper two or more dot addresses of the IP addresses closer to any of the dot addresses of the IP addresses of the transmission terminals 10 are selected. In this way, two or more candidates for the relay apparatus 30 that may be finally used can be selected. Thereafter, the pre-transmit information is transmitted and received between the request source terminal 10A and the destination terminal 10B via the candidate relay apparatuses 30. Then, the two or more candidate relay apparatuses 30 are narrowed down to one relay apparatus 30 that has the shortest time for transmission and reception of the pre-transmit information. Thus, the video data or audio data can be transmitted and received with the highest quality available under the existing environment of the communication network 2.

In accordance with the present embodiment, when narrowing the relay apparatuses 30, in addition to preferentially selecting the relay apparatuses 30 having the IP address close to the IP addresses of the transmission terminals 10 that perform a video conference, the maximum data transmission rate of the relay apparatus 30 may be taken into consideration. Thus, the candidates for the relay apparatus 30 can be narrowed by taking into consideration the actual environment of the communication network 2.

Further, in accordance with the present embodiment, the narrowing process may be performed with regard to the relay apparatuses 30 whose operating status is "online". Thus, the candidates for the relay apparatus 30 can be narrowed by taking into consideration the actual environment of the network 2 more accurately.

Preferably, the process of acquiring the display data may involve a mirror driver capable of transmitting the generated display data directly to a USB driver without passing through a program. In this case, the mirror driver may generate the display data, and the USB driver may transmit the display data to the transmission terminal 10 via the external unit I/F 118. In this case, there is no need for a program to acquire the display data, so that the resources for executing the program can be reduced.

In the foregoing embodiment, a program acquires the video data generated by the display driver and then transmits the video data to the transmission terminal 10. Alternatively, the program may acquire a drawing command generated by a GDI and then transmit the command to the transmission terminal 10aa. Because the drawing command has less volume than video data, the network load can be reduced. Preferably, the display data acquiring unit 451 may acquire only the display data displayed on a predetermined one of plural screens of a virtual display, and the acquired data may be transmitted by the display data transmitting unit 452. In this way, the video data being displayed on a screen other than a predetermined screen can be prevented from being shared with the conference counterpart, so that materials of highly confidential nature can be prevented from being disclosed. In this way, an increased level of security can be obtained.

The transmission managing system 50, the program providing system 90, and the maintenance system 100 according to the present embodiment may be provided by a single computer or plural computers assigned to the various functions or units of any of the systems. When the program providing system 90 is provided by a single computer, the program providing system 90 may transmit a program in a lump or in plural modules. When the program providing system 90 is provided by plural computers, the plural modules may be transmitted from the corresponding computers.

The transmission terminal program, the relay apparatus program, and/or the transmission managing program may be stored in a recording medium or the HD 204. The recording medium, the HD 204, or the program providing system 90 including the HD 204 may be provided as a program product which may be sold nationally or internationally. Thus, users at various locations can be provided with the transmission terminal program, the relay apparatus program, and/or the transmission managing program.

In accordance with the present embodiment, by using the modified quality managing table of FIG. 7 and the quality managing table of FIG. 15, the quality of the video data relayed by the relay apparatus 30 is managed in terms of image resolution. However, this is merely an example; preferably, the quality of the video data may be managed in terms of the depth of image quality of the video data, the sampling frequency of the audio data, or the bit length of the audio data. While the receive date/time is managed by using the tables of FIGS. 8, 10, and 12, this is merely an example. Preferably, only the receive time may be managed.

In accordance with the present embodiment, the IP address of the relay apparatus is managed by the table of FIG. 8 and the IP address of the transmission terminal is managed by the table of FIG. 10. Preferably, any information capable of identifying the relay apparatus 30 or the transmission terminal 10 on the communication network 2 may be used. For example, the FQDN (Fully Qualified Domain Name) of the relay apparatus or the transmission terminal may be managed. In this case, the IP address corresponding to the FQDN may be acquired by a DNS (Domain Name System) server. The "relay apparatus identifying information for identifying the relay apparatus 30 on the communication network 2" may also be referred to as "relay apparatus location information indicating the location of the relay apparatus 30 on the communication network 2", or "relay apparatus address information indicating the address of the relay apparatus 30 on the communication network 2". Similarly, the "terminal identifying information identifying the transmission terminal 10 on the communication network 2" may be referred to as "terminal location information indicating the location of the transmission terminal 10 on the communication network 2" or "terminal address information indicating the address of the transmission terminal 10 on the communication network 2".

In accordance with the present embodiment, a video conference system has been described as an example of the transmission system 1. However, this is merely an example. Other examples of the transmission system 1 may include an IP (Internet Protocol) telephone system and an Internet telephone system. Preferably, the transmission system 1 may include a car navigation system. In this case, one transmission terminal 30 may correspond to a car navigation apparatus mounted on an automobile while the other transmission terminal 30 may correspond to a managing terminal or server in a management center for managing the car navigation system. Alternatively, the other transmission terminal 30 may correspond to a car navigation apparatus mounted on another automobile.

Preferably, in the process of acquiring display data, only a portion of the data corresponding to an area (which may be referred to as a "window"), of a screen may be acquired instead of the entire screen, as will be described below. FIG. 27 illustrates an example of a screen being displayed by the external input apparatus 40aa. In this example, the screen includes an area (a) and an area (b). One of these areas may be selected by operating a mouse 212 and moving a pointer (c) in the screen of FIG. 27 and shared with the transmission terminal 10db. In this case, the display data of the selected area (a) may be acquired by the display data acquiring unit 451.

Preferably, the external input apparatus may be provided in advance with the display data acquiring unit 451 and the display data transmitting unit 452 stored in the storage unit 1000 of the transmission terminal 10. In this case, the process of transmitting and receiving the display data acquiring unit 451 and the display data transmitting unit 452 can be omitted, thereby reducing the load on the transmission terminal 10 and the external input apparatus 40. In accordance with the present embodiment, the external input apparatus 40 causes the display apparatus 400 to display data. The display apparatus 400 may be separate from or provided in the external input apparatus 40.

Preferably, the process of step S71 may involve the install determination unit 43 determining whether the display data acquiring unit 451 and the display data transmitting unit 452 are already installed. In this case, when it is determined in step S71 that the display data transmitting unit 452 is not installed, the program acquiring unit 44 may acquire the display data acquiring unit 451 and the data transmitting unit 452 stored in the transmission terminal 10aa and then have them installed (step S73).

Preferably, the external input apparatus 40aa may be provided in advance with the display data acquiring unit 451, thus eliminating the process performed by the install determination unit 43. The display data acquired by the display data acquiring unit 451 may be written into the storage unit 1000 of the mounted transmission terminal 10aa so that the display data transmitting unit 452 can be omitted.

Although this invention has been described in detail with reference to certain embodiments, variations and modifications exist within the scope and spirit of the invention as described and defined in the following claims.

The invention claimed is:

1. A transmission terminal comprising:
   a transmitter configured to transmit a display data of a screen shared with another transmission terminal to the other transmission terminal, after being authenticated by a transmission managing system which manages data transmission carried out between the transmission terminal and the other transmission terminal,
   wherein the transmission terminal participates in two-way video communication with the other transmission terminal after being authenticated by the transmission managing system, the two way video communication including image data obtained by an image capturing device at a location of the transmission terminal and the display data being different than the image data obtained by the image capturing device,
   wherein the transmitter transmits the display data to the other transmission terminal via a relay apparatus, and the relay apparatus to which the display data is transmitted is selected from a plurality of relay apparatuses on a basis of the transmission terminal sending preliminary information to the other transmission terminal via each of the plurality of relay apparatuses, and the selected relay apparatus is the relay apparatus for which the preliminary information reaches the other transmission terminal in a minimum amount of time.

2. The transmission terminal according to claim 1, wherein the transmission terminal receives destination status of the other transmission terminal, the destination status information including at least the operating status of the other transmission terminal, after being authenticated by the transmission managing system, and the transmission terminal participates in two-way video communication with the other transmission terminal after being authenticated by the transmission managing system.

3. The transmission terminal according to claim 1, wherein the plurality of relay apparatuses are determined on the basis of being relay apparatus which have an operating status of being online.

4. The transmission terminal according to claim 1, wherein the plurality of relay apparatuses are determined on the basis of being relay apparatuses which have a number of IP address elements similar to the transmission terminal's IP address or the another transmission terminal's IP address.

5. The transmission terminal according to claim 1, wherein the preliminary information includes time information of when the transmission terminal transmitted the preliminary information, and the other transmission terminal measures a difference between the time of receiving the preliminary information and the time information included in the preliminary information to determine the amount of time for which the preliminary information reaches the other transmission terminal.

6. The transmission terminal according to claim 1, wherein the display data is document, spreadsheet, or presentation material data.

7. A method implemented by a transmission terminal, the method comprising:
  transmitting, by a transmitter of the transmission terminal, a display data of a screen shared with another transmission terminal to the other transmission terminal, after being authenticated by a transmission managing system which manages data transmission carried out between the transmission terminal and the other transmission terminal; and
  participating in two-way video communication with the other transmission terminal after being authenticated by the transmission managing system, the two way video communication including image data obtained by an image capturing device at a location of the transmission terminal and the display data being different than the image data obtained by the image capturing device,
  wherein the transmitter transmits the display data to the other transmission terminal via a relay apparatus, and the relay apparatus to which the display data is transmitted is selected from a plurality of relay apparatuses on a basis of the transmission terminal sending preliminary information to the other transmission terminal via each of the plurality of relay apparatuses, and the selected relay apparatus is the relay apparatus for which the preliminary information reaches the other transmission terminal in a minimum amount of time.

8. The method according to claim 7, wherein the transmission terminal receives destination status of the other transmission terminal, the destination status information including at least the operating status of the other transmission terminal, after being authenticated by the transmission managing system, and the transmission terminal participates in two-way video communication with the other transmission terminal after being authenticated by the transmission managing system.

9. A non-transitory computer-readable recording medium for storing therein a computer program that includes instructions which when executed on a transmission terminal causes the transmission terminal to execute a method comprising:
  transmitting, by a transmitter of the transmission terminal, a display data of a screen shared with another transmission terminal to the other transmission terminal, after being authenticated by a transmission managing system which manages data transmission carried out between the transmission terminal and the other transmission terminal; and
  participating in two-way video communication with the other transmission terminal after being authenticated by the transmission managing system, the two-way video communication including image data obtained by an image capturing device at a location of the transmission terminal and the display data being different than the image data obtained by the image capturing device,
  wherein the transmitter transmits the display data to the other transmission terminal via a relay apparatus, and the relay apparatus to which the display data is transmitted is selected from a plurality of relay apparatuses on a basis of the transmission terminal sending preliminary information to the other transmission terminal via each of the plurality of relay apparatuses, and the selected relay apparatus is the relay apparatus for which the preliminary information reaches the other transmission terminal in a minimum amount of time.

10. The non-transitory computer readable medium according to claim 9, wherein the transmission terminal receives destination status of the other transmission terminal, the destination status information including at least the operating status of the other transmission terminal, after being authenticated by the transmission managing system, and the transmission terminal participates in two-way video communication with the other transmission terminal after being authenticated by the transmission managing system.

* * * * *